(12) United States Patent
Giokas

(10) Patent No.: US 9,319,425 B2
(45) Date of Patent: Apr. 19, 2016

(54) SYSTEMS AND METHODS FOR SELF-TUNING NETWORK INTRUSION DETECTION AND PREVENTION

(71) Applicant: Crypteia Networks S.A., Athens (GR)

(72) Inventor: Ioannis Giokas, Athens (GR)

(73) Assignee: Crypteia Networks S.A., Athens (GR)

( * ) Notice: Subject to any disclaimer, the term of this patent is extended or adjusted under 35 U.S.C. 154(b) by 0 days.

(21) Appl. No.: 14/338,617

(22) Filed: Jul. 23, 2014

(65) Prior Publication Data

US 2015/0033340 A1 Jan. 29, 2015

Related U.S. Application Data

(60) Provisional application No. 61/857,377, filed on Jul. 23, 2013.

(51) Int. Cl.
  G06F 11/00 (2006.01)
  H04L 29/06 (2006.01)
  G06F 12/14 (2006.01)
  G06F 12/16 (2006.01)

(52) U.S. Cl.
  CPC ........ H04L 63/1433 (2013.01); H04L 63/1416 (2013.01); H04L 63/1441 (2013.01)

(58) Field of Classification Search
  None
  See application file for complete search history.

(56) References Cited

U.S. PATENT DOCUMENTS

| | | | |
|---|---|---|---|
| 7,681,235 B2 * | 3/2010 | Chesla | G06F 21/552 726/22 |
| 9,015,808 B1 | 4/2015 | Koller et al. | |
| 2005/0235360 A1 * | 10/2005 | Pearson | H04L 29/06 726/23 |
| 2006/0156404 A1 | 7/2006 | Day | |
| 2007/0162973 A1 | 7/2007 | Schneier et al. | |
| 2008/0052774 A1 | 2/2008 | Chesla et al. | |
| 2008/0148398 A1 * | 6/2008 | Mezack | G06F 21/55 726/22 |
| 2008/0196102 A1 | 8/2008 | Roesch | |
| 2009/0158435 A1 * | 6/2009 | Milliken | G06F 21/562 726/24 |
| 2010/0100961 A1 | 4/2010 | Scheidell | |

(Continued)

FOREIGN PATENT DOCUMENTS

WO    WO-2007/109721 A2    9/2007

OTHER PUBLICATIONS

Common Vulnerabilities and Exposures: The Standard for Information Security Vulnerability Names. "Exposures,The Standard for Information Security Vulnerability Names." url: http://cve.mitre.org (2007).

(Continued)

Primary Examiner — Dede Zecher
Assistant Examiner — Trang Doan
(74) Attorney, Agent, or Firm — Foley & Lardner LLP; Christopher J. McKenna

(57) ABSTRACT

Systems and method of the present disclosure are directed to a network security tool. In some embodiments, the tool identifies a current vulnerability of a private network. The tool can determine a signature of an attack configured to exploit the current vulnerability. The tool can comparing the signature with active and inactive signatures stored in a signature repository. The tool can compare the signatures to identify an inactive signature corresponding to the signature of the attack configured to exploit the current vulnerability. The tool can automatically activate, responsive to the comparison, the identified inactive signature. The tool can use the activated signature to identify an exploit based on data packets received via the private network.

20 Claims, 14 Drawing Sheets

(56) References Cited

U.S. PATENT DOCUMENTS

| | | | |
|---|---|---|---|
| 2010/0175132 A1* | 7/2010 | Zawadowskiy | G06F 21/564 726/23 |
| 2010/0242114 A1 | 9/2010 | Bunker et al. | |
| 2013/0081141 A1* | 3/2013 | Anurag | G06F 21/55 726/23 |
| 2014/0157426 A1 | 6/2014 | Paek et al. | |

OTHER PUBLICATIONS

O'Hare, et al. "A Graph-Theoretic Visualization Approach to Network Risk Analysis." Visualization for Computer Security. Springer Berlin Heidelberg, 2008. pp. 60-67.

Iglun, et al. "State Transition Analysis: A Rule-Based Intrusion Detection Approach" IEEE Transactions on Software Engineering 21.3 (1995): pp. 181-199.

Payment Card Industry (PCI). "Data security standard." Attestation of Complian for Onsite Assessments—Service Providers, Version 2.0 (Oct. 2010).

International Search Report and Written Opinion for Application No. PCT/US2014/063672 dated Feb. 9, 2015(CRYPT-002PC).

International Search Report and Written Opinion for International Application No. PCT/US2014/047762 dated Nov. 14, 2014 (CRYPT-001PC).

Iso, Iso. "IEC 27001 (2005) Information technology, security techniques, information security management systems requirements." ISO, Geneva (2005).

Jajodia, et al. "Topological analysis of network attack vulnerability." Managing Cyber Threats. Springer US, 2005, pp. 247-266.

Kumar, et al. "A Pattern Matching Model for Misuse Intrusion Detection." Purdue University, Computer Science Technical Report. (1994).

Mitnick, et al. The art of deception: Controlling the human element of security. John Wiley & Sons, 2001.

Mitropoulos, et al. "Incident Response Requirements for Distributed Security Information Management Systems." Information Management & Computer Security 15.3 (2007) pp. 226-240.

Mitropoulos, et al. "On Incident Handling and Response: A state-of-the-art approach." Computers & Security 25.5 (2006) pp. 351-370.

Noel, et al. "Advanced Vulnerability Analysis and Intrusion Detection through Predictive Attack Graphs." Critical Issues in C4I, Armed Forces Communications and Electronics Association (AFCEA) Solutions Series. International Journal of Command and Control (2009).

Patsos, et al. "Expanding Topological Vulnerability Analysis to Intrusion Detection through the Incident Response Intelligence System." Information Management & Computer Security 18.4 (2010): 291-309.

Valdes, et al. "Adaptive, Model-based Monitoring for Cyber Attack Detection." Recent Advances in Intrusion Detection. Springer Berlin Heidelberg, Jan. 2000.

Voas, et al. "Defining an Adaptive Software Security Metric from a Dynamic Software Failure Tolerance Measure." Computer Assurance, 1996. COMPASS'96, Systems Integrity. Software Safety. Process Security. Proceedings of the Eleventh Annual Conference on. IEEE, 1996.

US Office Action on U.S. Appl. No. 14/531,450 dated Feb. 1, 2016.

* cited by examiner

SYSTEMS AND METHODS FOR SELF-TUNING NETWORK INTRUSION DETECTION AND PREVENTION

CROSS-REFERENCE TO RELATED APPLICATIONS

This application claims the benefit of priority under 35 U.S.C. §119 of U.S. Provisional Patent Application No. 61/857,377 filed Jul. 23, 2013, which is incorporated by reference herein in its entirety.

FIELD OF THE DISCLOSURE

This disclosure generally relates to systems and methods for a network security tool. In particular, systems and methods of the present disclosure provide a self-tuning network intrusion detection and prevention system, which is designed to automatically adapt to current threats to the network.

BACKGROUND OF THE DISCLOSURE

Computer networks or systems may have vulnerabilities that can be exploited by an attack or a threat. An exploited vulnerability can adversely affect the operation of the computer network, such as by slowing down the flow of data over the computer network, or preventing access to resources of the computer system.

BRIEF SUMMARY OF THE DISCLOSURE

The present disclosure relates to a self-tuning network intrusion and detection system. In particular, systems and methods of the present disclosure provide a network security tool that protects a private network by monitoring the data packets flowing through the network. The data packets are compared against specific signatures of an intrusion detection and prevention system ("IDS/IPS") defense line of the private network and can thereby be identified as malicious. The tool can activate, deactivate, and generate signatures and alerts. The signatures, which are relevant to the active network vulnerabilities, are activated within the tool, thereby improving the efficiency of the tool and the private network.

Corporations, companies, organizations, and private groups utilize computer networks to communicate, store information, and execute transactions or schedule services. Although computer networks can be created such that they are isolated, most often computer networks are created such that they are linked to the internet and thereby can utilize the internet to send information to more remote locations in the network. For example, a company utilizing a private network which is hosted on the internet can connect various different company locations all together into one network so that information, such as a word document, can be transmitted very quickly between locations which may be separated by fairly large geographical distances. Additionally, networks may be set up such that outside parties can interact with the network over the internet, as is the case in electronic commerce, one of the most common and widespread business practices taking place on the internet. In some situations it is also advantageous to allow external access such that a verified company employee or network member may access information stored on the network even when they are not at a company owned location. By enabling outside interaction with the network these advantages including but not limited to remote access and electronic commerce are enabled.

However, enabling outside access to a network also carries several disadvantages, including attacks from external sources attempting to damage the network or steal information from the network. Stealing information from a network can be particularly damaging to the owners of that network, especially if the information that was stolen is confidential or proprietary information like passwords lists or design plans. The stolen information can sometimes be used to carry out further malicious activities including but not limited to identity theft, further information theft, and asset theft. Such malicious activities can be costly for victims, and as a result, it is important that the chances of a network security breach be minimized.

In response to the threats against networks, networks can include and maintain some form of network security, such as firewalls, intrusion detection systems, intrusion prevention systems, and intrusion detection and prevention systems. Firewalls are in path security measures which are intended to control the flow of information into a network. This is accomplished by examining the incoming data packets and comparing them to a set of rules. Any offending packets, usually assumed to be malicious, are dropped by the firewall, thereby protecting the network that is behind the firewall. Firewalls monitor traffic which is incoming into the network and are capable of dropping data packets which may be malicious. Thus, the firewall may be capable of defending the network from a variety of external threats.

An intrusion detection system detects malicious attacks and then raises an alarm such that an authorized system administrator is notified of the attack and can take the appropriate actions to stymie it. An intrusion prevention system works to identify potential attacks and then automatically takes the appropriate action to disrupt or cease the attack. An intrusion prevention system may or may not notify system administrators when an attack is detected and thwarted by the system. An intrusion detection and prevention system (IDPS) combines these two functionalities, detecting potential attacks and both alerting system administrators and automatically moving to impede the attack. The IDPS may or may not notify system administrators if it is successful in stopping the attack, or may notify a system administrator if it fails to sufficiently stop the attack and other actions may need to be taken.

An IDPS can be implemented via signature detection. In signature detection methodologies, the IDPS monitors data packets which are flowing through the network and compares this information with a pre-determined set of rules which identify known attack patterns. These attack patterns are known as signatures. As the IDPS monitors more signatures, the increased load upon the network and IDPS may increase the amount of time to analyze data packets due to the increase amount of patterns with which the IDPS compares packets. To reduce the load, the IDPS can be tuned to monitor for relevant attack patterns to protect the network are being monitored for by the IDPS. Since not all networks are the same, not all networks have the same vulnerabilities; e.g., a particular exploit for one network may not be viable on another network. Thus, it may be sufficient to maintain monitoring for attack patterns which can actually affect the network being protected.

As it can be challenging and time consuming to tune an IDPS, systems and methods of the present disclosure can facilitate self-tuning a network intrusion detection and prevention system mechanism using a network security tool. The network security tool of the present disclosure can use signature based intrusion detection and prevention and can self-tune by activating and deactivating signatures for which it is monitoring a network. Thus, monitoring for relevant signatures can reduce network load and increasing the efficiency of the network or system. Further, the network security tool can adapt to new threats.

The network security tool can include, use, or gain access to a process, a vulnerability assessment tool, an intrusion detection and prevention system (including a relevant signature list), a monitoring mechanism, and a network connection. The tool (e.g., via a vulnerability assessment tool) can determine or identify vulnerabilities in the network that can be exploited and a possible signature that is indicative of a threat or attack intended to exploit the vulnerability. In some embodiment, the network security tool may include a vulnerability assessment tool. In some embodiments, the network security tool may access or be otherwise communicate with a vulnerability assessment tool (e.g., via a network). The vulnerability assessment tool may detect vulnerabilities in the network, and feed them to the network security tool. The vulnerability assessment tool may feed the detected vulnerabilities in the form of a vulnerabilities list using a common scheme or standard. The vulnerabilities tool may provide a signature list that includes signatures of vulnerabilities or attacks configured to exploit a vulnerability. This signature list can be compared or communicated with a signature list of the IDS/IPS. The signature list of the IDS/IPS may include both active and inactive signatures. Inactive are signatures may or may not have been utilized in the past by the IDS/IPS to perform intrusion detection and prevention, but are not currently taken into consideration in the IDS/IPS monitoring procedures of the network. The IDS/IPS or network security tool may save inactive signatures, in case they might be needed again in the future. The active signatures are the signatures that are actually used in the monitoring of the network by the IDS/IPS to detect or prevent intrusions or attacks configured to exploit a vulnerability. The network connection of the system allows the system (which can be embedded or installed somewhere along the network) to monitor the flow of data through the network, and/or continually probe the network for potential vulnerabilities using the vulnerability assessment tool. For example, the tool may use the output of the vulnerability assessment tool when available, or the tool may perform passive vulnerability scanning on network traffic, data packets, TCP data, or activities logs to determine or identify vulnerabilities of the network. The network connection may provide access to Internet to allow the tool to get up to date with the latest exploits and signatures that are crowd-sourced and specified by the worldwide security community. Thus, the systems and methods of the present disclosure operate on the network to detect threats, identify potential threats, and update the signature list in accordance with new threats or old threats that no longer exist.

At least one aspect is directed to a method of mitigating intrusions via a computer network. The method includes the vulnerability assessment tool identifying a current vulnerability of a private network. The method includes the vulnerability assessment tool determining a signature of an attack configured to exploit the current vulnerability. The method includes a network security device of the network security tool comparing the signature with active and inactive signatures stored in a signature repository. The network security device compares the signatures to identify an inactive signature corresponding to the signature of the attack configured to exploit the current vulnerability. The method includes the network security device automatically activating, responsive to the comparison, the identified inactive signature. The method includes an intrusion detector using the activated signature to identify an exploit based on data packets received via the private network.

In some embodiments, the method includes the vulnerability assessment tool identifying one or more current vulnerabilities of the private network. For example, the vulnerability assessment tool may identify vulnerabilities based on a time interval such as daily, weekly, monthly, hourly, every 12 hours or some other time interval specified by a system administrator or in a configuration file. The method can include the vulnerability assessment tool (e.g., of the network security tool) determining one or more signatures of attacks configured to exploit the one or more current vulnerabilities. The method can include the network security device comparing the one or more signatures with active and inactive signatures stored in a signature repository. The method can include the network security device automatically deactivating, responsive to the comparison, one or more active signature stored in the signature repository that do not correspond to the one or more signatures of the attacks configured to exploit the one or more current vulnerabilities.

In some embodiments, the method can include identifying a second current vulnerability of the private network. The method can include determining a second signature of a second attack configured to exploit the second current vulnerability. The method can include comparing the second signature with the active and inactive signatures stored in the signature repository. The method can include determining, based on the comparison, that the second signature corresponds to an active signature stored in the signature repository. The method can include using, by the intrusion detector, the active signature corresponding to the second signature to identify a second exploit based on data packets received via the private network.

In some embodiments, the method includes identifying a plurality of current vulnerabilities of the private network. The method can include identifying a plurality of signatures corresponding to the plurality of current vulnerabilities. The method can include comparing the plurality of signatures with the active and inactive signatures stored in the signature repository. The method can include automatically activating, responsive to the comparison, inactive signatures stored in the signature repository that correspond to the plurality of signatures. The method can include automatically deactivating, responsive to the comparison, active signatures stored in the signature repository that do not correspond to the plurality of signatures.

In some embodiments, the method can include receiving an indication that the current vulnerability is resolved. The method can include automatically deactivating, responsive to the indication, the signature corresponding to the current vulnerability. In some embodiments, the method can include using a fuzzy logic algorithm to determine the signature of the attack configured to exploit the current vulnerability.

In some embodiments, the method can include identifying a second current vulnerability of the private network. The method can include determining a second signature of a second attack configured to exploit the second current vulnerability. The method can include comparing the second signature with the active and inactive signatures stored in the signature repository. The method can include determining, based on the comparison, that the second signature does not correspond to active or inactive signatures stored in the signature repository. The method can include automatically generating, based on the comparison, a new signature based on the second signature. The method can include activating and storing the new signature in the signature repository for use by the intrusion detector.

In some embodiments, the signature comprises an attack pattern. In some embodiments, the method includes receiving a plurality of logs of network activity associated with computing devices of the protected network. In some embodiments, the method includes determining, based on the plurality of logs, a pattern indicative of a signature of an attack.

In some embodiments, the method includes monitoring, by the intrusion detector, the data packets of the private network to identify the exploit based on the active signature corresponding to the second signature. The method can include responsive to identifying the second exploit, generating an alert. The method can include providing the alert to an administrator device of the private network. In some embodiments, the method can include obtaining, via a public network, updates on current vulnerabilities established by a plurality of users of the public network.

In some embodiments, the method includes identifying, by the vulnerability assessment tool, a second active signature stored in the signature repository. The method can include obtaining, by the network security device, a plurality of signatures corresponding to one or more active vulnerabilities of the private network. The method can include automatically deactivating, by the network security device, the second signature responsive to the second signature being absent from the plurality of signatures corresponding to the one or more active vulnerabilities of the private network.

At least one aspect is directed to a system for mitigating intrusions via a computer network. The system includes a vulnerability assessment tool. The vulnerability assessment tool is configured to identify a current vulnerability of a private network and determine a signature of an attack configured to exploit the current vulnerability. The system includes a network security device. The network security device is configured to compare the signature with active and inactive signatures stored in a signature repository. The network security device compares the signature to identify an inactive signature corresponding to the signature of the attack configured to exploit the current vulnerability. The network security device is further configured to automatically activate, responsive to the comparison, the identified inactive signature. The network security device is further configured to deactivate, responsive to the comparison, an active signature stored in the signature repository that does not correspond to the signature of the attack configured to exploit the current vulnerability. The system includes an intrusion detector configured to use the activated signature to identify an exploit based on data packets received via the private network.

In some embodiments, the vulnerability assessment tool is further configured to identify a second current vulnerability of the private network and determine a second signature of a second attack configured to exploit the second current vulnerability. In some embodiments, the network security device is further configured to compare the second signature with the active and inactive signatures stored in the signature repository. The network security device can be further configured to determine, based on the comparison, that the second signature corresponds to an active signature stored in the signature repository. The intrusion detector can be further configured to use the active signature corresponding to the second signature to identify a second exploit based on data packets received via the private network.

In some embodiments, the vulnerability assessment tool is further configured to identify a plurality of current vulnerabilities of the private network and identify a plurality of signatures corresponding to the plurality of current vulnerabilities. The network security device can be further configured to compare the plurality of signatures with the active and inactive signatures stored in the signature repository. The network security device can be further configured to automatically activate, responsive to the comparison, inactive signatures stored in the signature repository that correspond to the plurality of signatures. The network security device can be further configured to automatically deactivate, responsive to the comparison, active signatures stored in the signature repository that do not correspond to the plurality of signatures.

In some embodiments, the system can be further configured to receive an indication that the current vulnerability is resolved. The system can be further configured to automatically deactivate, responsive to the indication, the signature corresponding to the current vulnerability.

In some embodiments, the vulnerability assessment tool is further configured to use a fuzzy logic algorithm to determine the signature of the attack configured to exploit the current vulnerability.

In some embodiments, the vulnerability assessment tool is further configured to identify a second current vulnerability of the private network and determine a second signature of a second attack configured to exploit the second current vulnerability. The network security device can be further configured to compare the second signature with the active and inactive signatures stored in the signature repository. The network security device can be further configured to determine, based on the comparison, that the second signature does not correspond to active or inactive signatures stored in the signature repository. The network security device can be further configured to automatically generate, based on the comparison, a new signature based on the second signature. The network security device can be further configured to activate and store the new signature in the signature repository for use by the intrusion detector.

In some embodiments, the signature comprises an attack pattern. In some embodiments, the network security tool includes a passive vulnerability assessor configured to passively monitor network traffic or activities logs to identify a vulnerability, an exploit of the vulnerability, or a signature of an attack configured to exploit the vulnerability. In some embodiments, the passive vulnerability assessor is further configured to receive a plurality of logs of network activity associated with computing devices of the protected network. In some embodiments, the system is further configured to determine, based on the plurality of logs, a pattern indicative of a signature of an attack.

In some embodiments, the intrusion detector is further configured to monitor the data packets of the private network to identify the exploit based on the active signature corresponding to the second signature. The intrusion detector can be further configured to responsive to identifying the second exploit, generate an alert. The intrusion detector can be further configured to provide the alert to an administrator device of the private network.

At least one aspect is directed to a system to collect, analyze, store and process vulnerability information, exploits and exploit code information and intrusion detection signature information utilized by a user. The system can include a plurality of sources providing the vulnerability information. The sources can provide the exploits and exploit code information associated with the vulnerability information. The sources can also provide the intrusion detection signatures information. The system can include a vulnerability database updated at least daily. The vulnerability database can be in communication with the system. The system can include a plurality of modules to collect, analyze, store and process the vulnerability information. The exploits and exploit code information and the intrusion detection signature information can use one or more topological vulnerability analysis techniques.

In some embodiments, the plurality of sources include a common vulnerabilities and exposures list. In some embodiments, the sources include a dynamic list maintained by one or more vendors. In some embodiments, the sources include one or more response centers, such as a Computer Emergency Response Centers (CERT). In some embodiments, the sources include one or more independent security researchers.

In some embodiments, the system includes a vulnerabilities database and a signature database. The vulnerabilities database and the signature database are in communication with the system. In some embodiments, the system includes an exploits database that is in communication with the system. In some embodiments, the system includes an intrusion detection signatures database that is in communication with the system.

In some embodiments, the exploits and exploits code information is obtained from one or more websites, from one or more security tools, or from one or more mailing lists. In some embodiments, the vulnerability information is obtained from one or more vulnerability assessment tools, one or more vendor websites, one or more associated mailing lists, or one or more open source research communities. In some embodiments, the information related to the intrusion detection and prevention signature is obtained from one or more intrusion detection and prevention systems, one or more intrusion detection and prevention vendor websites, one or more associated mailing lists, or one or more open source research communities.

In some embodiments, the system can include one or more modules or components including, e.g., a vulnerability collection module, a vulnerability storage module, an intrusion detection signature collection module, an intrusion detection signature storage module, an exploits collection module, and an exploits storage module.

In some embodiments, the system normalizes the vulnerability information. In some embodiments, the system presents the information to the user as output. In some embodiments, the system correlates the vulnerability information with the exploits and exploit code information and the intrusion detection signatures information. The system can correlate this information using topological vulnerability information by matching the exploits and exploit code information related to the vulnerability information and the intrusion detection signatures information related to the vulnerability information and the exploit and exploit code information.

In some embodiments, the system calculates a significance of the collected and stored vulnerability information, utilizing one or more common vulnerability scoring systems. In some embodiments, the system presents the significance of the collected and stored vulnerability information to the user based on the significance of the stored vulnerability information. In some embodiments, the system presents the intrusion detection signatures needed to mitigate the significance of the collected and stored vulnerability information to the user.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a network security tool.

A. Computing and Network Environment

Figure 1A:
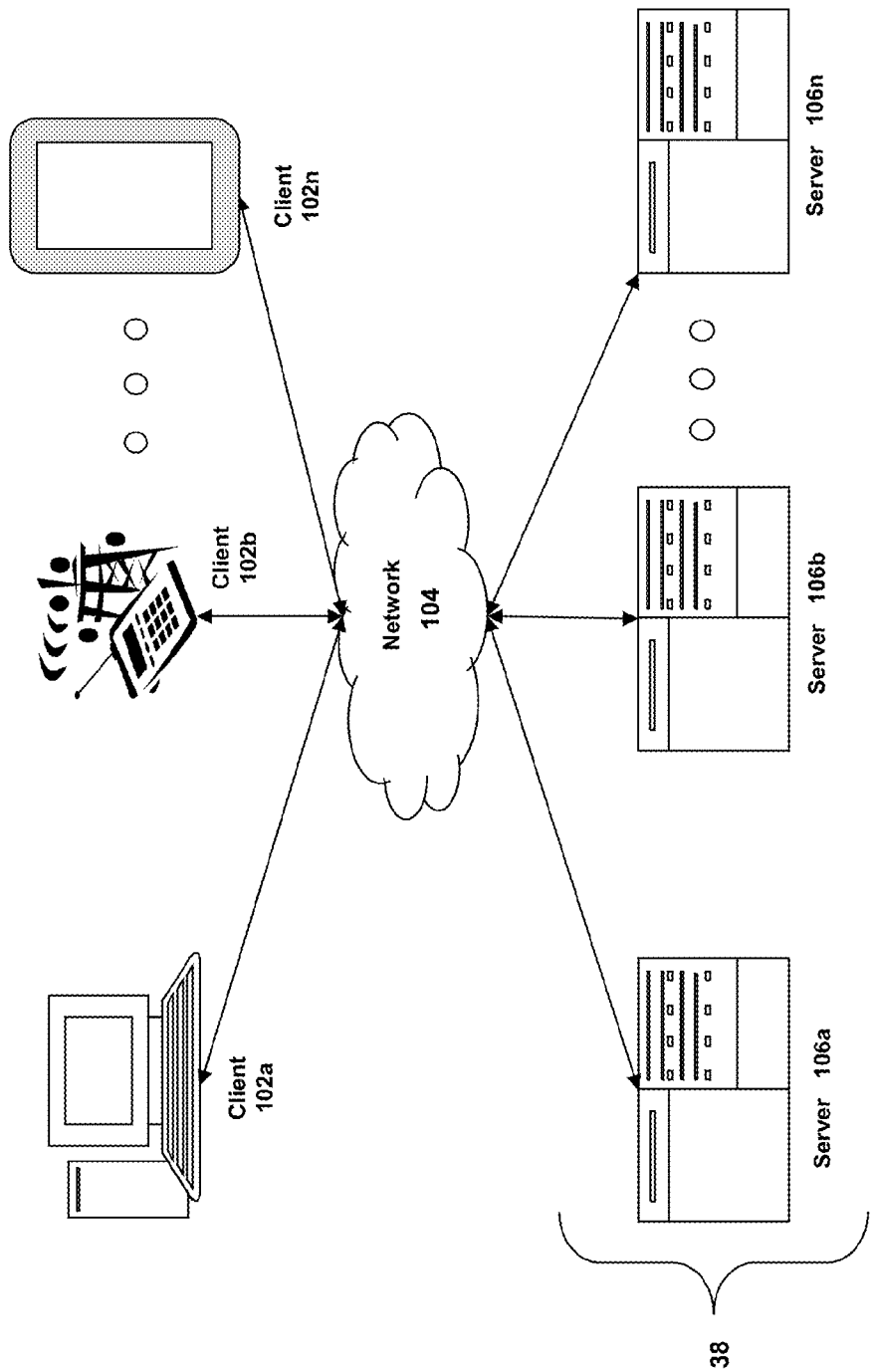
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
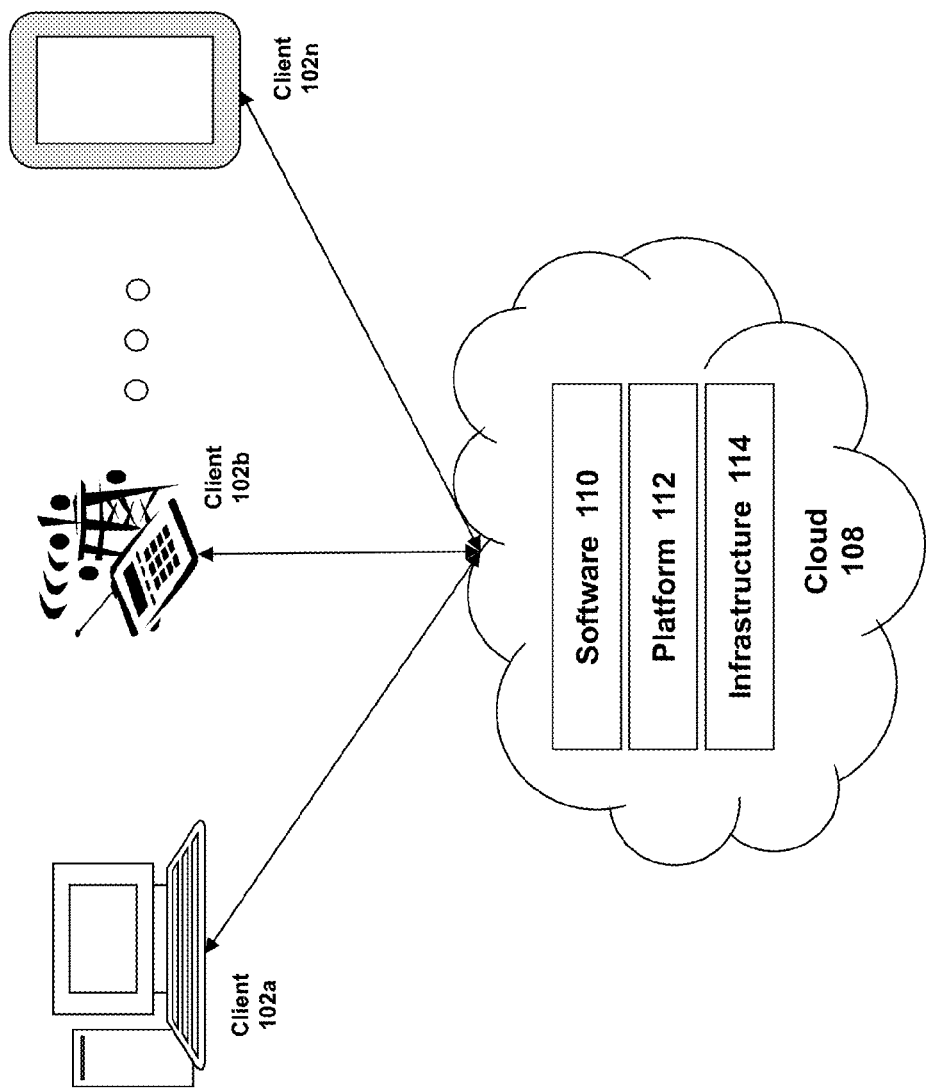
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
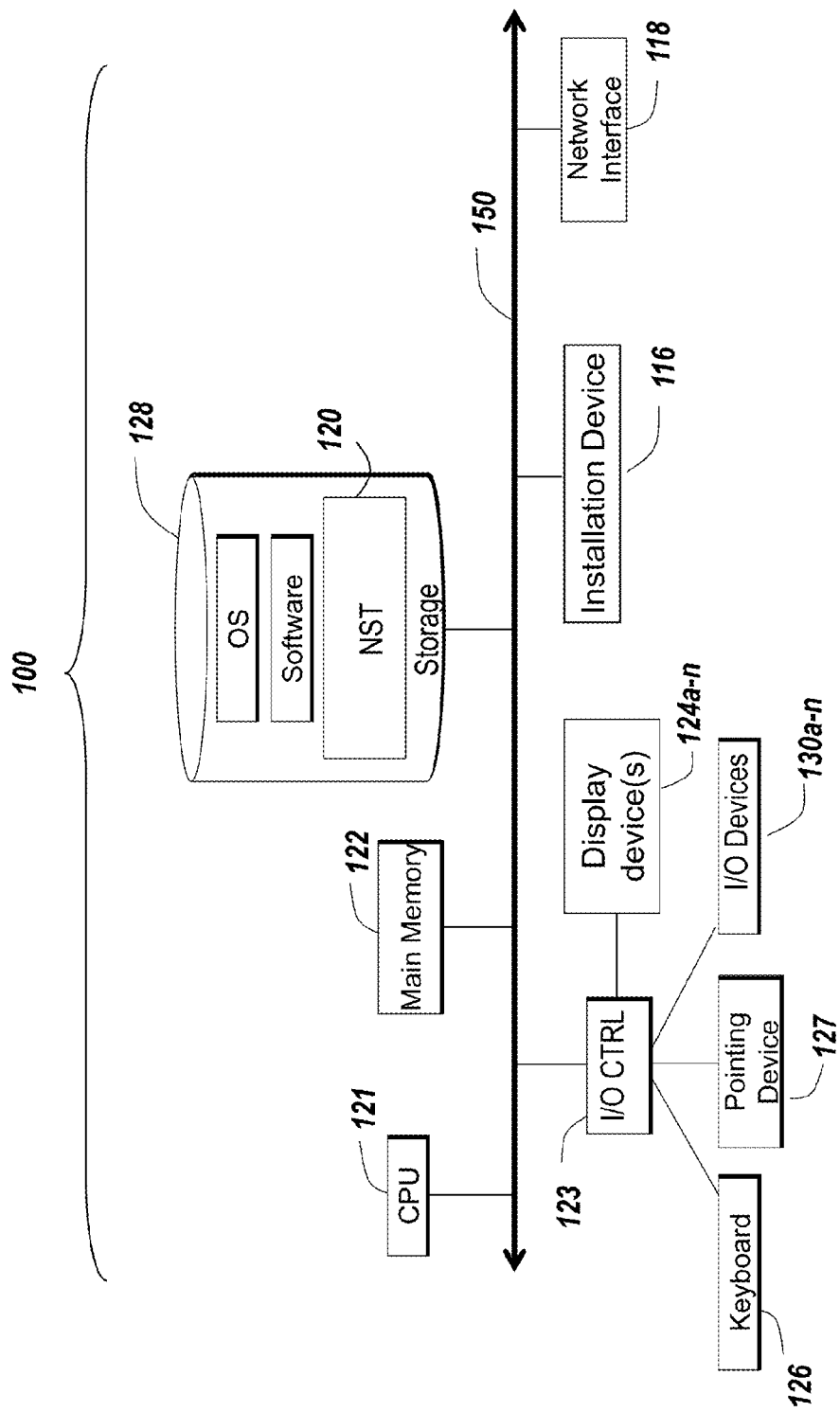
FIGS. 1C and 1D are block diagrams depicting embodiments of computing devices useful in connection with the methods and systems described herein.
Figure 1D:
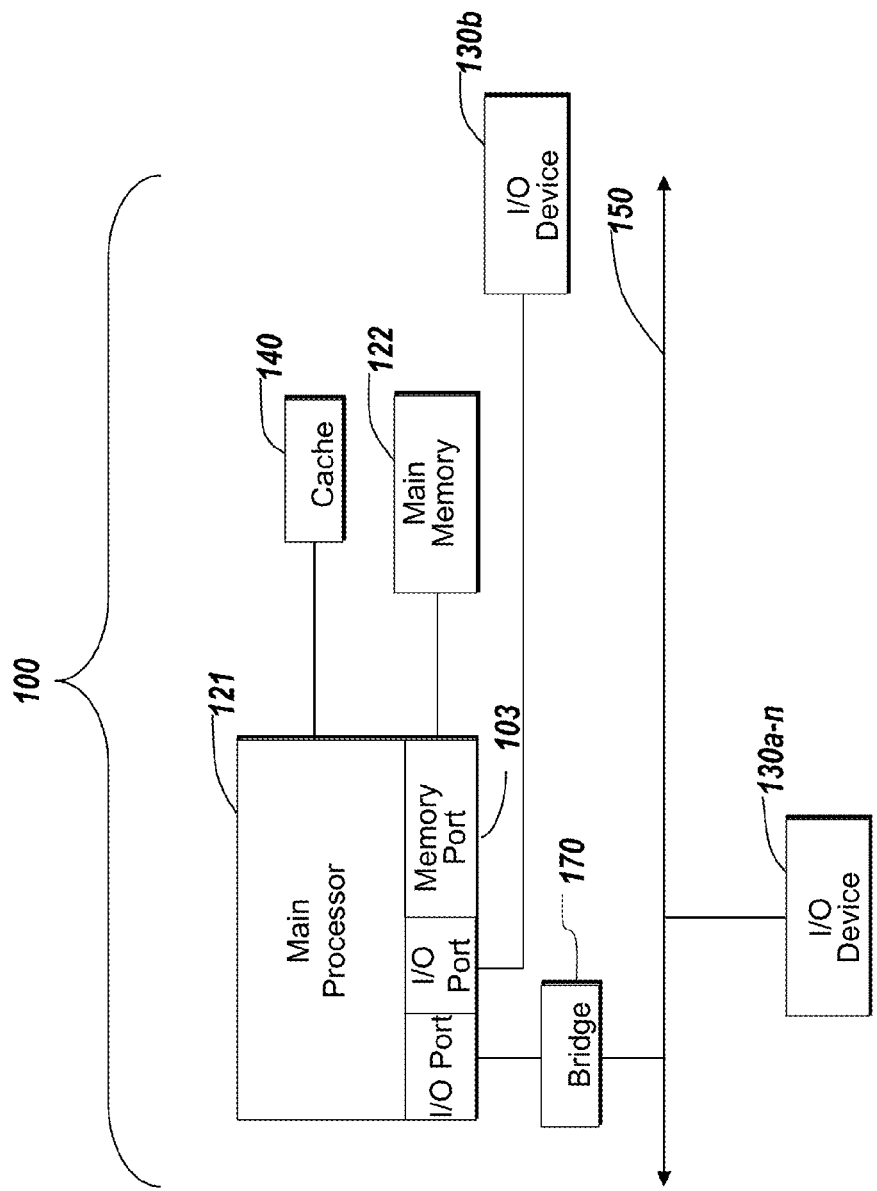

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a network security tool 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (Fe-RAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the network security tool. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESS-CARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Network Security Tool

Systems and method of the present solution are directed to a self-tuning network security tool that facilitates automatically identifying a current vulnerability of a computer system or network, and preventing an attack from exploiting the current vulnerability. The network security tool may include, use or have access to Vulnerability Assessment (VA) tools and Intrusion Detection and Prevention Systems (IDS/IPS), and facilitate the management and collation of the knowledge that is generated by these tools or systems.

In brief overview, and in some embodiments, a vulnerability may refer to a weakness in software, hardware, or firmware of a system. Such weakness might allow an adversary to violate the confidentiality, the availability, and the integrity of the system, its processes/applications, as well as, the data the system generate and manage. In network security, vulnerability may refer to the weakness of a network device/station that could allow unauthorized intrusion in the network. Further, human weaknesses regarding the information security sensitivity are considered as vulnerabilities that can be exploited by social engineering techniques. In security industry, there are a plethora of vulnerability schemes and registries specified, generated, and maintained by various enterprises, organizations or research institutions. Such registries for instance are the CERT Advisories maintained by the Software Engineering Institute at Carnegie Mellon University of Pittsburgh, Pa., the CVE scheme maintained by MITRE Corporation of Bedford, Mass., the Bugtraq vulnerability list maintained by Security Focus of SYMANTEC CORPORATION of Mountain View, Calif. Various entities, corporations, or software firms may also maintain public vulnerabilities registries regarding the products they develop in relevant web sites. In various embodiments, the tool can be configured to receive, access, look up, process, analyze or otherwise obtain and utilize information of one or more vulnerabilities lists or registries in one or more formats, standards, or schemes. For example, the tool can be configured to use the CVE vulnerability scheme created by MITRE Corporation. However, in some embodiments, the tool can be vulnerability scheme independent.

In some embodiments, an exploit refers to a piece of software, a chunk of data, or a sequence of commands that takes advantage of a bug or vulnerability in order to cause computer software and/or hardware to have unintended or unanticipated behavior. Such behavior may aim to gain control of a system, allowing privilege escalation, or a denial-of-service attack. Signatures can refer to attack patterns that are used by the tool. The signatures, or patterns, specify attacks in a network, a network node, a networked device, at a host level.

The tool can be deployed to identify cases of illegitimate behavior and/or utilization of a system at runtime. To do so, the tool can differentiate between legitimate and illegitimate behavior and utilization, including, e.g., misuse-based or signature based behaviors. For example, the tool can use a known set of misuse patterns, or signatures, to filter execution traces. Signatures can be generated by focusing on a limited amount of information that was sufficient to distinguish an attack from a legitimate use of the network or system in the past.

To minimize false negatives, i.e., failure to identify some illegitimate behaviors, and false positives, i.e., wrong identification of some legitimate behaviors as illegitimate, the tool can maintain an up-to-date library of misuse patterns or signatures. Therefore, the tool can mitigate, prevent, or minimize the likelihood of new legitimate uses being identified as misuses, i.e., false positives, and the tool can refine the signatures to distinguish them from illegitimate uses.

A VA tool can assess the vulnerabilities of one or more system or one or more network to generate great volumes of network defense information regarding the security weaknesses of the examined system or network. The network security tool can use the information generated by the VA tool to provide coherence, connection and/or correlation for a system in order to provide a holistic view of vulnerabilities that could be taken into account for the efficient confrontation of the system vulnerabilities. Thus, the network security tool of the present disclosure can automatically implement a plan of action to address findings of the VA tool. For example, the network security tool can provide context and coherence with regard to maintenance, ground, and sound structuring of network defense information by dynamically assessing vulnerabilities in context with a current a network and by taking into account settings of the underlying infrastructure of the examined network and the actual risk posed by the identified vulnerabilities. Further, the tool can generate and store security events in a correlated manner. For example, predictive computations on attack graphs can be used to map vulnerability paths, which might be chosen as attack activities by adversaries. Based on attack paths, strategies for protecting critical network assets can be computed.

In some embodiments, the network security tool can obtain, identify, or collect security information related to vulnerabilities, exploits and IDS/IPS signatures. The tool can collect security information related to vulnerabilities, exploits and IDS/IPS signatures from a large number of sources (Web, mailing lists, hacking websites, security systems, vulnerability scanning reports, specific tools like SNORT of CISCO Corporation of San Jose, Calif.), and store them in one or more databases. The tool may then normalize the vulnerability information (e.g. redundant data may be de-duplicated) and correlate the vulnerability information with relative exploit code or IDS/IPS signatures. When the tool 120 parses a report from a VA tool (e.g., Open Vulnerability Assessment System ("OpenVAS") which is a framework of several services and tools offering a vulnerability scanning and vulnerability management solution), the tool can identify current vulnerabilities. In some embodiments, the tool may construct the attack and response paths for the identified vulnerabilities using Topological Vulnerability Analysis techniques, score one or more (some or all) identified vulnerability using a Common Vulnerability Scoring System from 0 to 10 (e.g., CVSSv2 which is an industry standard for assessing the severity of computer system vulnerabilities and maintained by the National Infrastructure Advisory Council of the United States of America) and provide the IDS/IPS signature(s) required to confront this particular attack. Thus, the tool can used as a proactive security mechanism (e.g. during the vulnerability analysis of a network infrastructure) and as an ongoing, continuous self-tuning mechanism. Moreover the tool can be used for efficiently and effectively tuning the IDS systems according to the unique security requirements of the network infrastructure.

Figure 3:
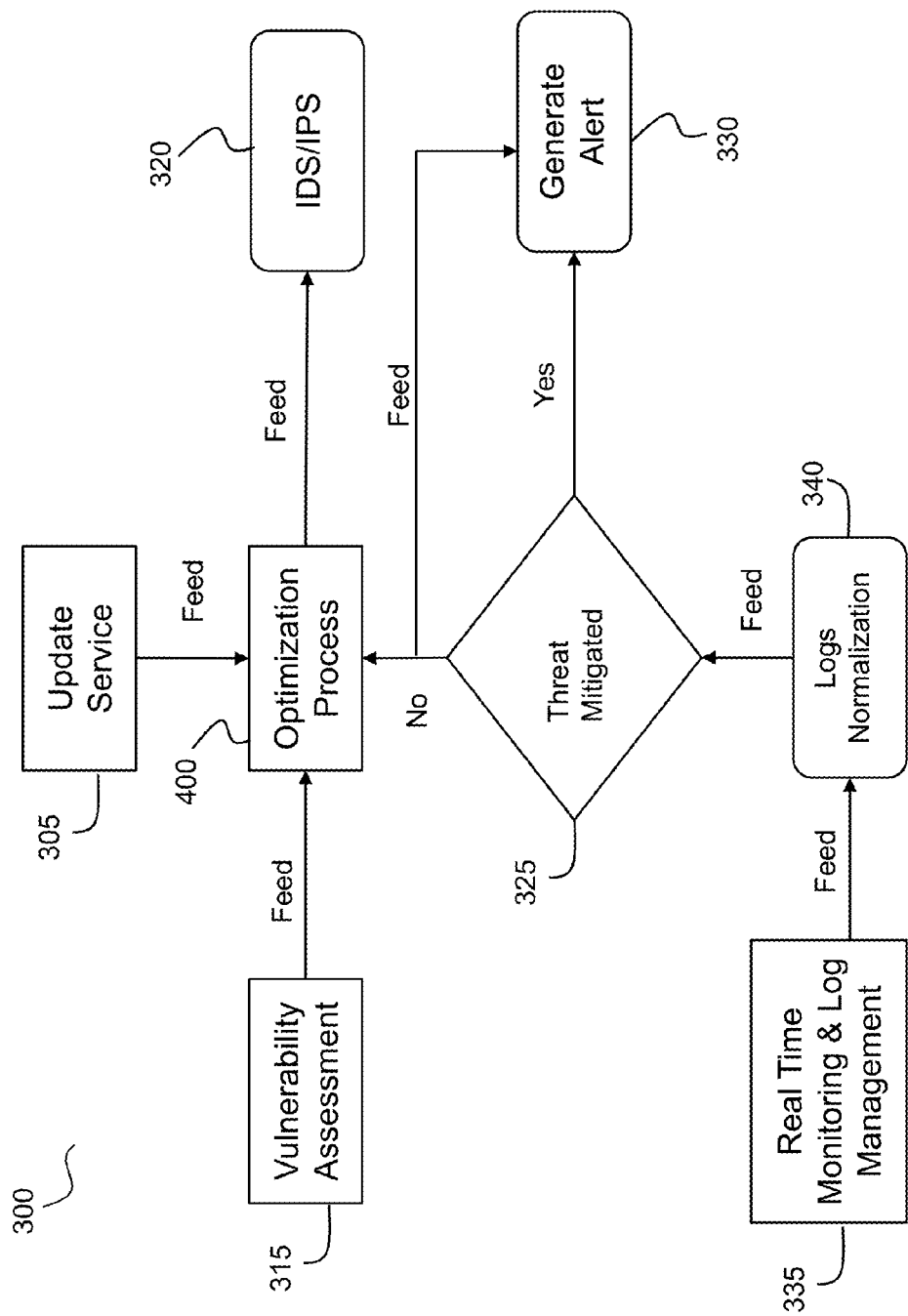
FIG. 3 is an illustrative overview of a flow diagram for a network security tool, in accordance with an embodiment.

Referring to FIG. 3, a process 300 of self-tuning a network intrusion and detection system via a network security tool is shown. At step 305, an update service of the tool receives updates on the latest vulnerabilities, exploits and signatures via a resource accessed by a network (e.g., Internet, World Wide Web). These updates may be identified and provided by a security community and generally applicable to networks or systems. At step 315, a vulnerability assessment tool scans the protected network (e.g., the private network the method 300 is attempting to protect) to generate a list of vulnerabilities that are identified within the network, including, e.g., on network devices, operating systems, desktop applications, Web applications, databases, etc. At step 335, a real time monitoring and log management process obtains, identifies, receives or otherwise captures activities logs that occur at the runtime of the network. A log normalization process 340 receives this activities log information from process 335 and transforms the logs to vulnerabilities formatted under a common scheme (e.g., the common scheme used at step 315 by vulnerabilities assessment tool to report or provide the vulnerabilities to the optimization process 400). At step 325, the process determines information regarding the history of mitigated or active vulnerabilities with the protected network (e.g., if the threat is mitigated or if the threat is not mitigated).

At step 400, an optimization process of the tool receives the updates on vulnerabilities, exploits and signatures from the update service 305 and the identified current vulnerabilities in the protected network as identified by the vulnerability assessment at step 315. In some embodiments, at step 400, the optimization process receives the information or logs regarding the history of mitigated or active vulnerabilities within the network via processes 325, 340 and 335.

Figure 4:
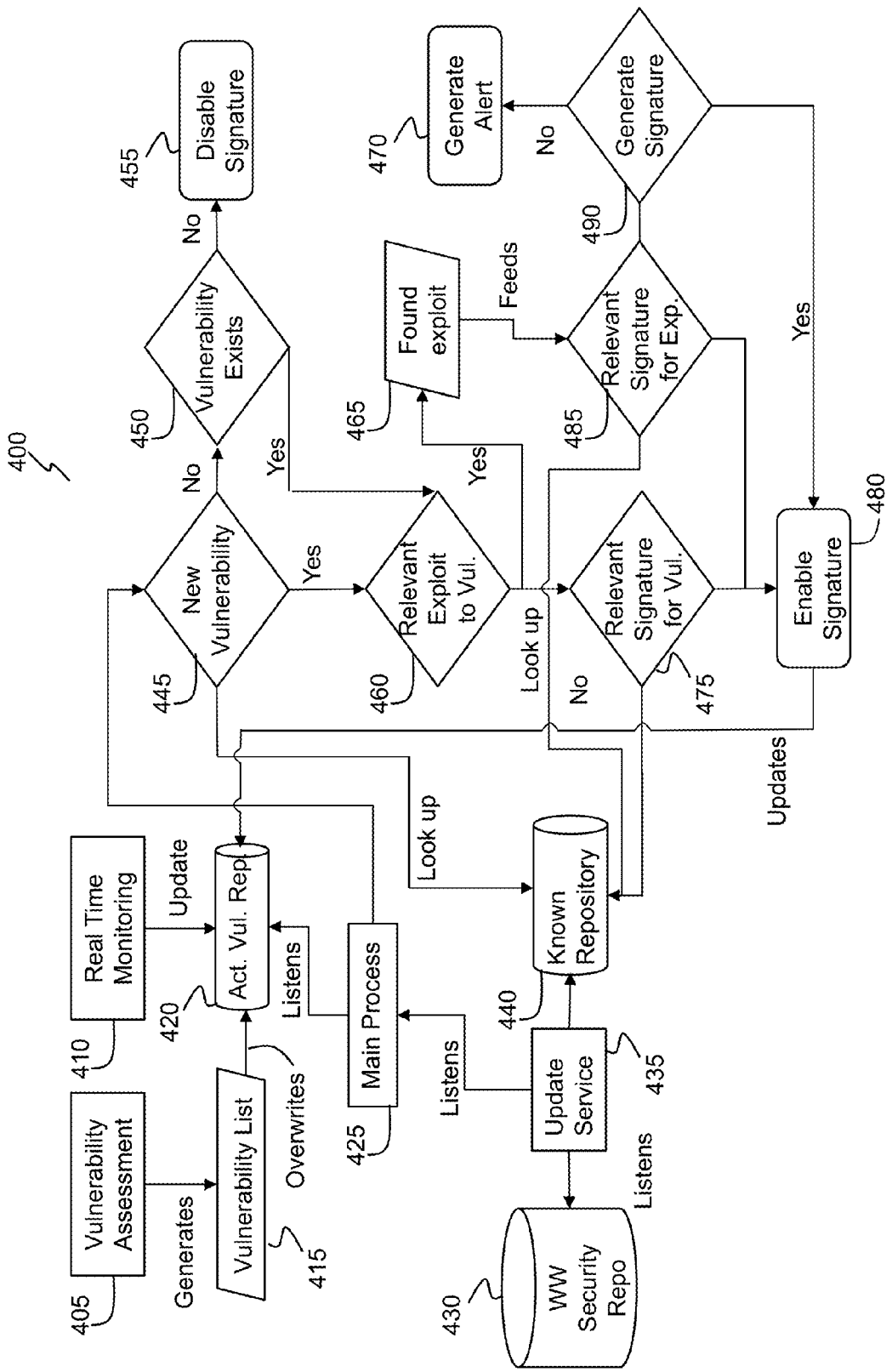
FIGS. 4-8 are illustrative flow diagrams of self-tuning processes of the network security tool, in accordance with embodiments.

The optimization process 400 (which is shown in FIG. 4) may receive the information via a real-time data feed, streaming data feed, push, pull, network communication, internal system communication, via a network interface, a user interface (e.g., graphical user interface), etc. For example, the optimization process 400 uses the vulnerabilities list generated by the vulnerability assessment at step 315 by scanning the protected network, and the latest vulnerabilities, exploits and signature updates as they occur on the World Wide Web and provided by the security community at step 305. Further, and in some embodiments, these inputs to the optimization process 400 may be provided in a common scheme to allow the optimization process to correlate the information. For example, a common scheme may include the standard for Information Security Vulnerability Names, referred to as Common Vulnerabilities and Exposures ("CVE").

Figure 2:
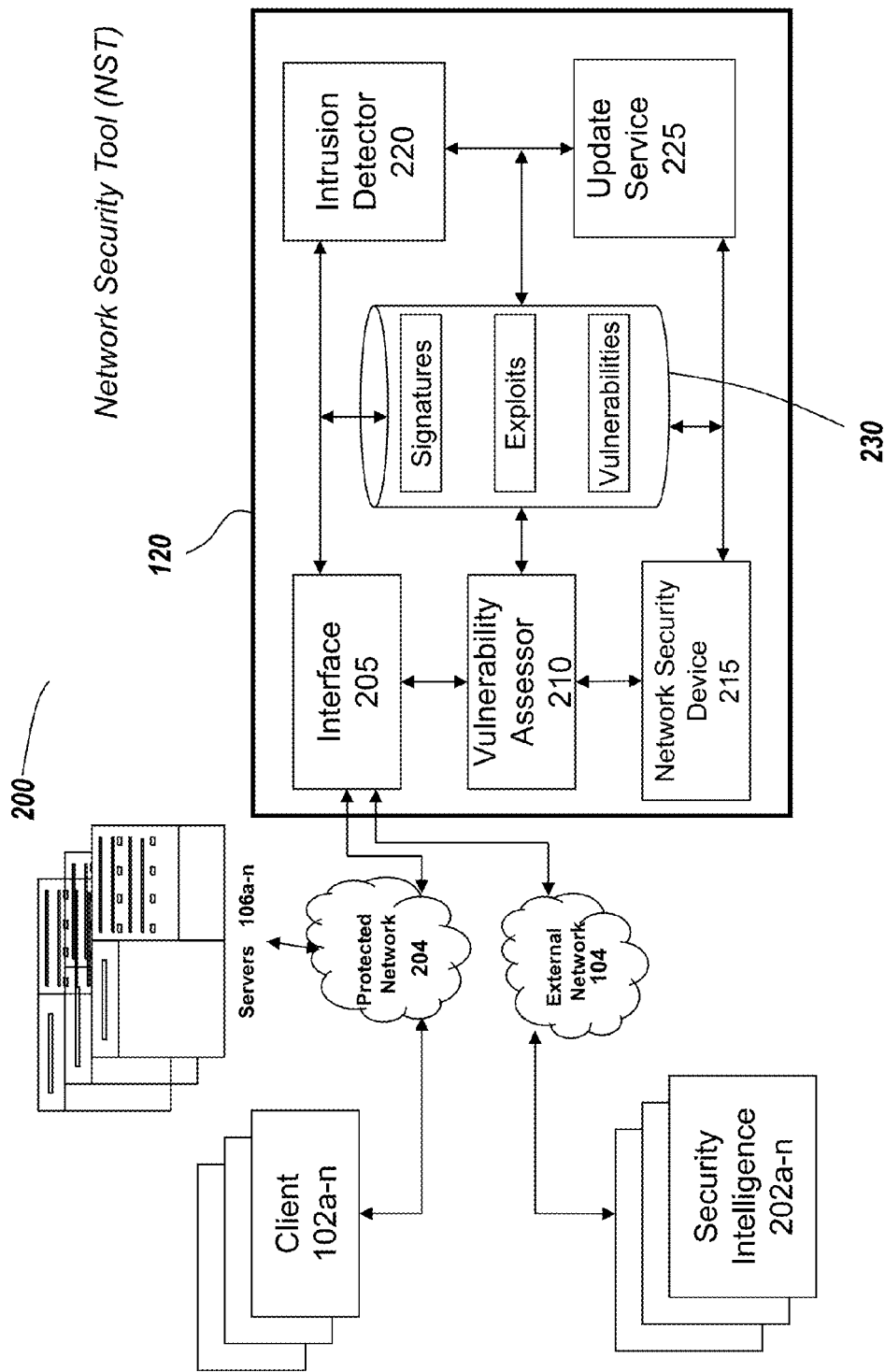
FIG. 2 is an illustrative embodiment of a system comprising a network security tool.

Referring to FIG. 2, an embodiment of a system 200 including a network security tool is depicted. In brief overview, the system 200 includes one or more clients 102a-n (e.g., end user devices, computing devices, administrator devices) or servers 106a-n that communicate via a private or protected network 204. In some embodiments, network 204 may be similar to network 104, except that is a protected or private network in that it may not be accessible to the general public or confined to a company, organization or entity. The system 200 may include or have access to one or more security intelligence repositories 202a-n, such as a Worldwide security Repository, via an external network 104. The system 200 may include a network security tool 120. The tool 120 can be designed and constructed to perform one or more self-tuning network intrusion, detection and prevention functions. In some embodiments, the tool 120 includes an interface 205, vulnerability assessor 210, network security device 215, intrusion detector 220, update service 225 and database 230. In some embodiments, the tool 120 may not include a vulnerability assessor 210; rather, the tool 120 may receive a vulnerabilities list from a vulnerability assessment tool via a protected network 204 or an external network 104, or otherwise obtain a vulnerabilities list. In some embodiments, the network security device 215 is designed and constructed to perform one or more self-tuning or optimization functions, as described in FIG. 4. In some embodiments, the intrusion detector 220 can include an IDS/IPS system. The tool 120 may include one or more components 205, 210, 215, 220, 225, and 230. Each component may execute on, include or have access to one or more processor, logic array, circuitry, or other components as shown in FIGS. 1A-1D.

In further detail, the tool 120 can include an interface 205. The interface 205 can be designed and constructed to communicate via a protected network 204 or an external network 104. A protected network 204 may refer to a private network, e.g., a network that the network security tool 120 is attempting to protect. For example, this network may refer to an internal network, or intranet, of a company, organization, university, or other entity. In some embodiments, the interface 205 is designed and constructed to communicate via an external network 104, such as the World Wide Web or Internet. In some embodiments, the interface 205 facilitates interaction or communication between one or more modules or components of, or associated with, the tool 120, such as vulnerability assessor 210, network security device 215, intrusion detector 220, update service 225, or database or repository 230.

In some embodiments, the network security tool 120 includes a vulnerability assessor 210. In some embodiments, the vulnerability assessor 210 can identify a current vulnerability of a private network and determine a signature of an attack configured to exploit the current vulnerability. A vulnerability assessor may refer to a vulnerability assessment tool, such as WIRESHARK, NMAP, METASPLOIT, OPENVAS, AIRCRACK. In some embodiments, the vulnerability assessor 210 can include a vulnerability scanner. The vulnerability assessor 210 can be designed and constructed to capture traffic of a TCP broadcast domain and apply one or more filters to intercept or identify certain traffic (e.g., between clients 102a-n, servers 106a-n, or simulated packets by the tool 120 or other device). For example, the vulnerability assessor 210 can obtain data packets of a protected network, save the data packets to a data file or database, and analyze the data packets to identify stray IP addresses, spoofed packets, unnecessary packet drops, or suspicious packet generation from a single IP address. In some embodiments, the vulnerability assessor 210 can craft data packets and perform scans on a granular TCP level, such as a SYN scan, ACK scan, etc. In some embodiments, the vulnerability assessor 210 can determine the operating system and version, based on network responses such as a TCP handshake. Further, the vulnerability assessor 210 can determine which ports are open and whether these open ports can be exploited. Using various vulnerability assessment and scanning techniques, the vulnerability assessor 210 can provide, create, generate or otherwise identify a list of vulnerabilities of the protected network 204. The vulnerabilities list can be stored in database 230 in memory or provided to one or more component of the tool 120 for further processing.

In some embodiments, the vulnerability assessor 210 can perform real time monitoring of data packets of the network 204. In some embodiments, network security tool 120 may include a passive vulnerability assessor configured to perform real monitoring of network traffic or analyze activities logs. In some embodiments, the vulnerability assessor 210 may include a passive vulnerability assessor, or be configured to perform a function thereof (e.g., the network security tool may use a separate vulnerability assessment tool that may perform a routine assessment of vulnerabilities and provide the vulnerabilities list to the network security tool, and/or the network security tool may continuously passively monitor network traffic in real-time to identify vulnerabilities). In some embodiments, the tool 120 can obtain or aggregate activity logs from one or more client 102a-n or server 106a-n. In some embodiments, the vulnerability assessors may include a Security Incident and Event Manager (SIEM) designed and constructed to store and interpret logs or events generated by software running on a data network. In some embodiments, the tool may include a separate component that performs one or more monitoring or SIEM function.

In some embodiments, the tool 120 can perform passive vulnerability assessment based on log sets generated by the real time monitoring component of the tool. For example, this real time monitoring may be performed by the component of the tool that translates logs from 410 to update 420 repository as depicted in FIG. 4. The translation of the outcome of a real time monitoring process can emulate a passive vulnerability assessment process. For example, and in some embodiments, the tool can alter an active vulnerabilities repository responsive to real time monitoring of network traffic or activities logs generating, identifying, obtaining or otherwise providing an update to the active vulnerabilities repository. For example, the tool can perform real time monitoring to identify a mitigated or active vulnerability.

For example, and in some embodiments, the tool can identify a first vulnerability by receiving the information about the first vulnerability by a vulnerability assessment tool that performed a periodic vulnerability assessment on the private network. The tool may additionally perform a passive vulnerability assessment on the network by continuously monitoring network traffic of the private network via one or more activity logs. Based on this passive, continuous monitoring, the tool may identify a second current vulnerability of the private network. The tool may then determine a second signature of a second attack configured to exploit the second current vulnerability, compare the second signature with the active and inactive signatures stored in the signature repository. Based on the comparison, the tool may determine that the second signature corresponds to an active signature stored in the signature repository. Thereafter, the tool (e.g., via the intrusion detector) can use the active signature corresponding to the second signature to identify a second exploit based on data packets received via the private network. The tool may also use the active signature for the first signature to identify exploits. For example, the tool may provide these active signatures to an IDS/IPS system.

The vulnerability assessor 210 can be configured to perform a log normalization function in order to translate, format or alter the log information such that it conforms to a common vulnerability scheme or standard. In some embodiments, the vulnerability assessor 210 can perform one or more functions associated with the optimization process 400 of FIG. 4 including, e.g., vulnerability assessment 400, or real-time monitoring 410.

In some embodiments, the tool 120 includes a network security device 215. The network security device 215 can be designed and constructed to perform self-tuning functions using information such as a vulnerabilities list or other information related to known, active or inactive vulnerabilities, exploits and signature as obtained via the networks 204 or 104 or database 230. The network security device 215 can, for example, be designed and constructed to perform one or more steps in of the optimization process 400 shown in FIG. 4. For example, the network security device 215 can receive information from or generated by vulnerability assessor 210, update service 225, database 230, or other resources accessible via interface 205 and networks 204 and 104, such as security intelligence repositories 202a-n.

Using information about current vulnerabilities of the protected network 204, the network security device 215 can compare a signature of an attack configured to exploit the current vulnerability with active or inactive signatures stored in a signature repository or database 230. If the network security device 215 determines, based on the comparison, that the signature of the exploit of the current vulnerability is an inactive signature, then the network security device 215 can automatically activate the identified inactive signature of the exploit. In some embodiments, the network security device 215 can further determine whether an exploit exists for the current vulnerability and, if there is no known exploit for the vulnerability, the network security device 215 may not activate any signature.

In some embodiments, the network security device 215 can check each active signature in the database 230 to determine whether the active signature of a vulnerability or signature of an exploit of a vulnerability matches a current vulnerability of the protected network 204 or device of the protected network 204. In some embodiments, a vulnerability of a protected network 204 can refer to a vulnerability associated with servers, computing devices, network nodes, systems, databases, etc. of the protected network 204.

In some embodiments, the tool 120 includes an update service 225 designed and constructed to listen, periodically ping, receive, or otherwise obtain current or up-to-date information from a Worldwide security repository such as a security intelligence database or resource 202a-n. This information may be provided by a security community or crowd sourced, and accessed via an external network 104. This security information can include, e.g., vulnerabilities, exploits, and signatures for same. The information may be time stamped or otherwise flagged so the tool 120 can determine if the information is new. In some embodiments, the tool 120 may receive a real-time data feed of security information. The update service 225 can perform one or more functions or steps associated with optimization process 400 including, e.g., update service 435.

Referring now to FIG. 4, an illustrative data flow for the optimization process 400 of a self-tuning network intrusion and detection system via a network security tool is shown. In some embodiments, the network security tool 120, or one or more components, modules, or processors thereof, can be designed, constructed or configured to perform one or more steps of optimization process 400. In brief overview, the optimization process 400 includes a main process 425, a vulnerability assessment 405, and real time monitoring 410, and an update service 435. The main process 425 can initiate or reinitiates the optimization procedure 400 by listening to activity demonstrated by the update service 435, and Active Vulnerabilities Repository 420. For example, to update the Known Vulnerabilities Exploits and Signatures Repository 440, the update service 435 listens to new recorded vulnerabilities, exploits, and signatures that become known within the worldwide security community. For example, this information is illustrated abstractly by the Worldwide Security Intelligence Repository 430.

Figure 5:
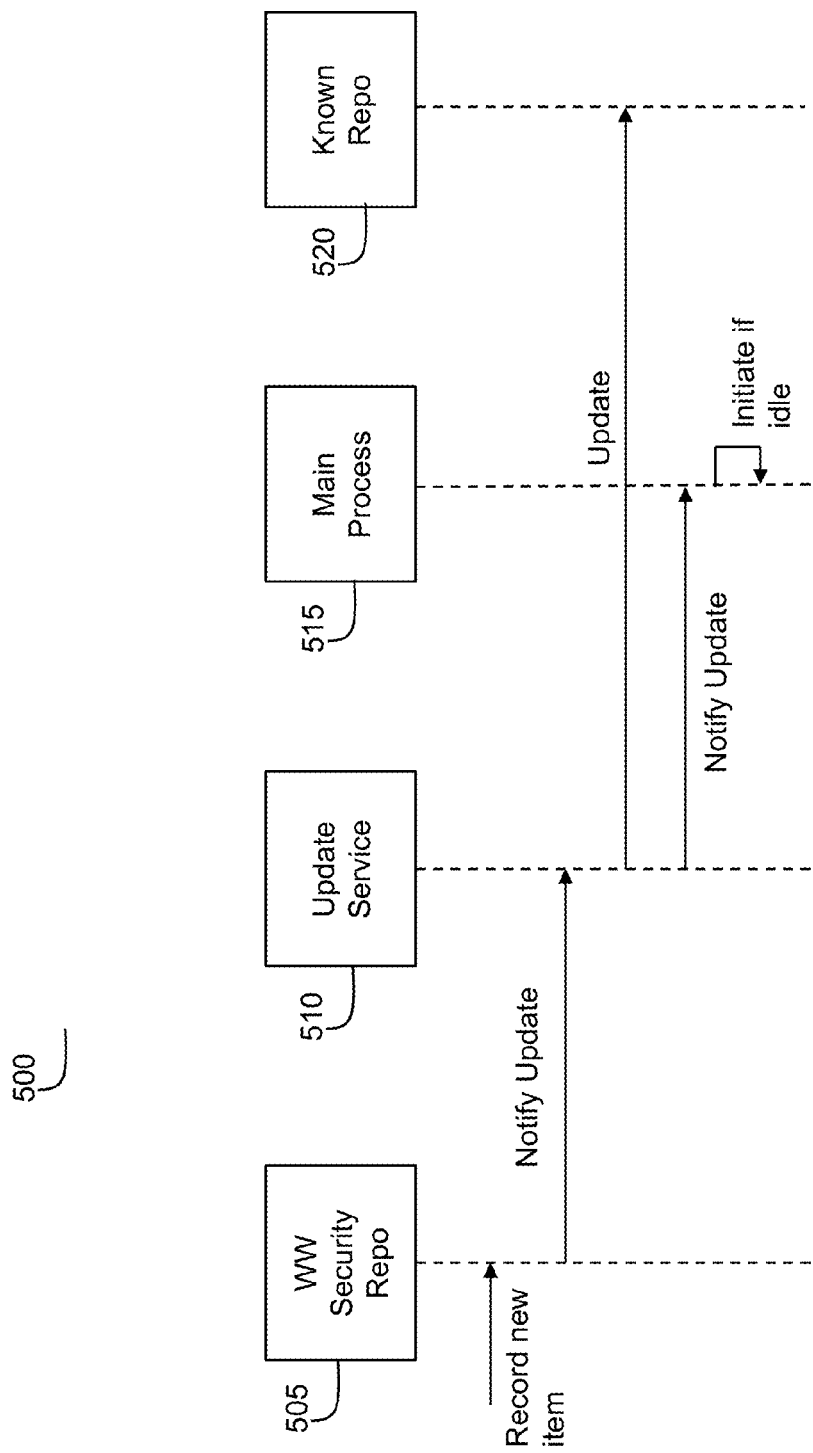

In some embodiments, the main process 425 receives a notification when the update service 435 updates the known vulnerabilities, exploits, and signatures repository 440. The notification may be any data communication that can notify the main process 425 of an update including, e.g., an alert, prompt, tag, indication, etc. Responsive to receiving the notification, the main process 425 can initiate the optimization procedure, in the event the main process was in an idle state, as shown in FIG. 5.

Figure 6:
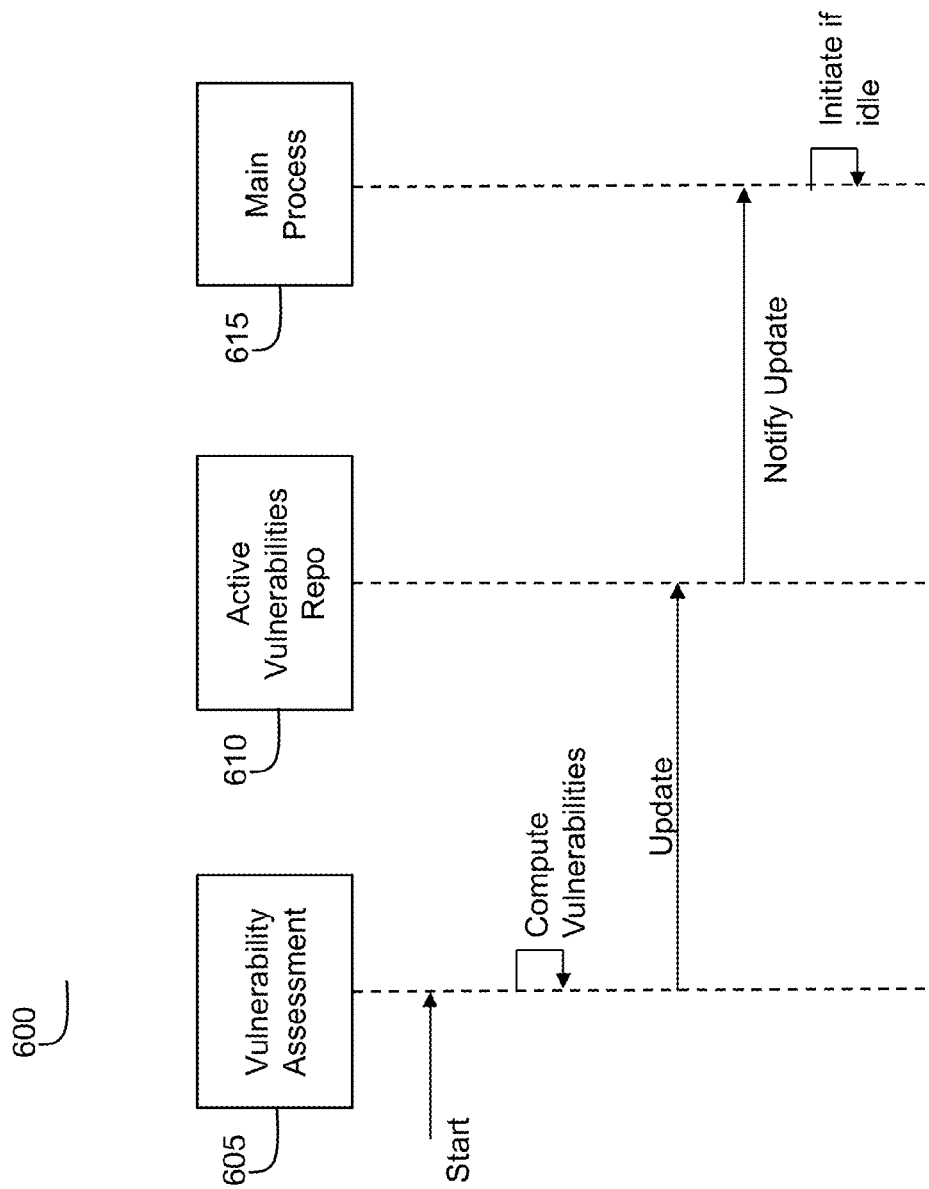
Figure 7:
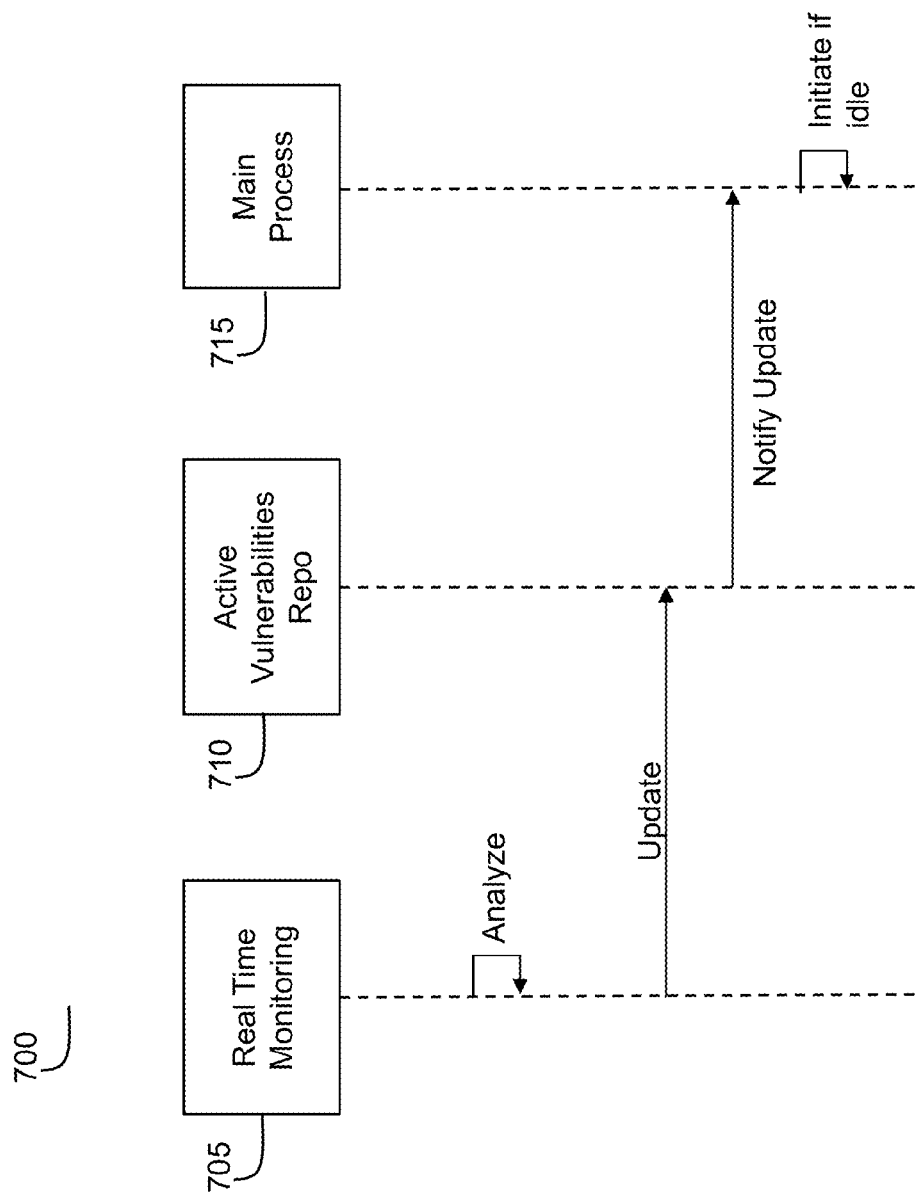

In some embodiments, the main process 425 initiates or reinitiates the optimization procedure responsive to the active vulnerabilities repository 420 being updated. The active vulnerabilities repository 420 may be altered responsive to or after one or more activities occurs. In some embodiments, the active vulnerabilities repository 420 is altered responsive to the vulnerability assessment 405 being finalized. For example, the vulnerability assessment 405 process (e.g., performed by a vulnerability assessment tool) can generate outcome in the form of a Vulnerability List 415. The vulnerability list 415 can be used to rewrite the active vulnerabilities repository 420 (as shown in FIG. 6). In some embodiments, the active vulnerabilities repository 420 is altered responsive to real time monitoring 410 generating, identifying, obtaining or otherwise providing an update to the active vulnerabilities repository 420. For example, the real time monitoring process 410 can identify a mitigated or active vulnerability. Thereafter, main process 425, which is listening to the active vulnerabilities repository for such an update, can restart, initiate or reinitiate the optimization procedure 400, e.g., in the event the procedure is idle (as shown in FIG. 7).

Figure 8:
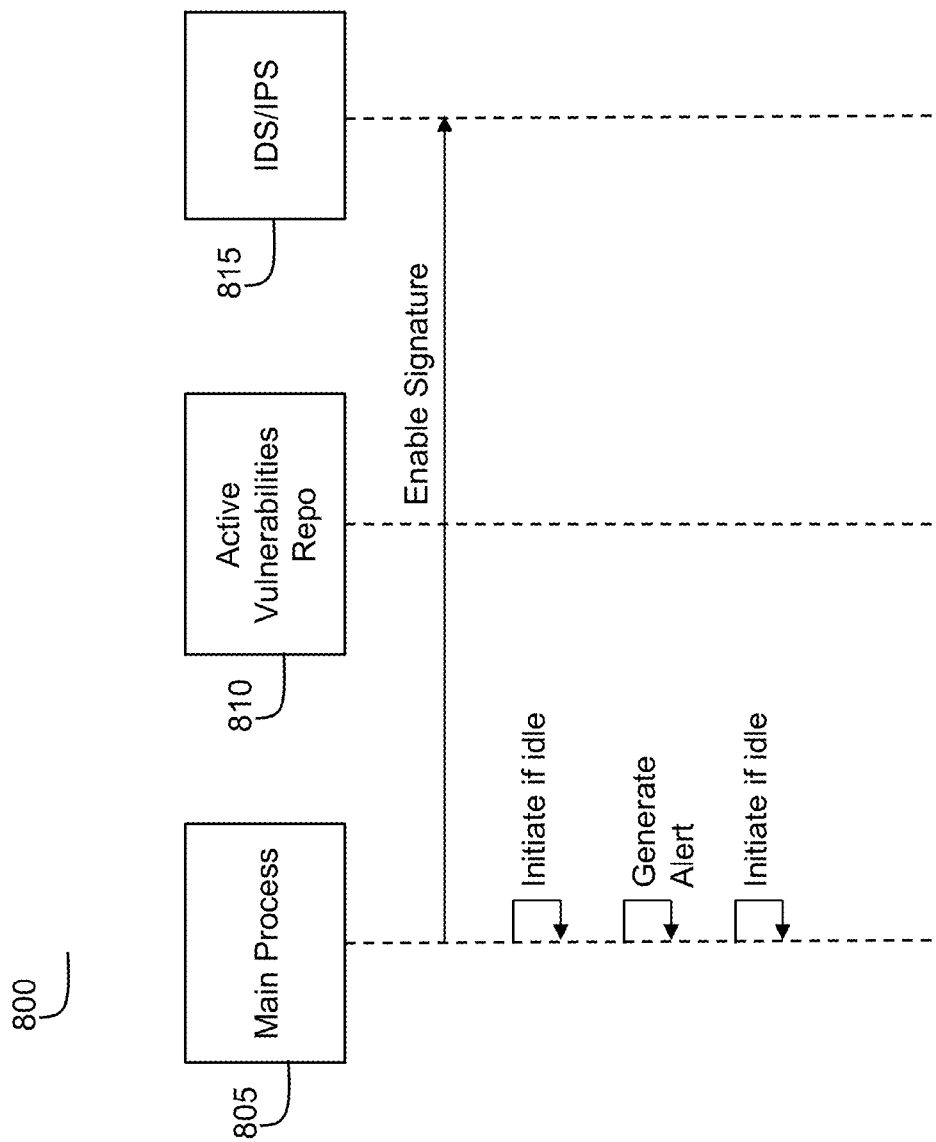

In some embodiments, the main process 425 can be triggered to initiate or reinitiate the optimization procedure 400 when main process 425 updates the active vulnerabilities repository 420 by enabling signatures in the IDS/IPS of the protected system or generating alerts (as shown in FIG. 8).

In further detail, the optimization process 400 includes performing a vulnerability assessment 405 to generate a vulnerability list 415. In some embodiments, the optimization procedure includes receiving the generated vulnerability list 415, rather than performing the vulnerability assessment (e.g., receiving the generated vulnerability list 415 from a vulnerability assessment tool via a network). The optimization process 400 can include real time monitoring 410. The optimization process 400 can include the vulnerabilities list 415 and or the real time monitoring process 410 altering an active vulnerabilities repository 420. For example, the vulnerability list 415 may initially overwrite the active vulnerabilities repository 420, and the real time monitoring 420 may update the active vulnerability repository 420 in real-time, periodically, or upon triggering of an event or condition or other indication to update the active vulnerabilities repository 420.

The optimization process 400 can include a main process 425 that initiates or reinitiates the optimization procedure. The main process 400 can listen to the active vulnerabilities repository 420 for an indication to initiate, reinitiate, restart or otherwise perform a function of the optimization procedure. The main process 425 can also listen to an update service 435. The update service 435 can listen to a Worldwide Security Intelligence Repository 430 for any information regarding vulnerabilities, exploits, or signatures as identified by a security community or network security entities. Upon receiving an update from the Worldwide security intelligence repository 430, the update service 435 can provide the information to the main process 425 or an indication of the new information, responsive to which the main process 425 may initiate or reinitiate or restart the optimization procedure 400.

During the optimization procedure 400, the network security tool can determine whether there is a new vulnerability 445. For example, the main process 425 may receive or otherwise identify a potentially new vulnerability. The main process 425 may receive, get, request, or otherwise obtain or identify an update notifications from update service 435 or active vulnerabilities repository 420. For each vulnerability $V_i$ stored in the active vulnerabilities repository 420, the tool can begin a check cycle starting at step 445.

At step 445, the tool determines whether vulnerability $V_i$ is a new vulnerability. In some embodiments, the tool can check $V_i$ against the vulnerabilities stored in the known vulnerabilities, exploits, and signatures repository 440 to determine whether $V_i$ is a new vulnerability. For example, the tool can perform a lookup into the known vulnerabilities, exploits, and signatures repository 440 to determine whether the identified vulnerability is a new vulnerability. The tool may compare the potentially new vulnerability $V_i$ with known vulnerabilities in repository 440 using a common scheme or standard. For example, the format for the vulnerability may be in a common scheme or use a common standard, or may be normalized or otherwise translated or reformatted such that the comparison of vulnerabilities is accurate.

In the event that $V_i$ is not a new vulnerability, at step 450, $V_i$ can be checked against the active vulnerabilities repository 420 to determine whether $V_i$ is still an active vulnerability of the protected system (e.g., by performing a lookup into the active vulnerabilities repository 420). If $V_{i\ is}$ not an active vulnerability, the procedure disables one or more signatures related to $V_i$ in the IDS/IPS of the protected system at step 455.

However, if $V_i$ is determined to be an active or new vulnerability (e.g., $V_i$ exists in the active vulnerabilities repository 420), the process 400 can include performing, at step 475, a lookup in the known vulnerabilities, exploits and signature repository 440 to determine whether there is a relevant exploit $E_i$ for vulnerability $V_i$. In the event the tool determines there is a known exploit $E_i$ for $V_i$, (e.g., an exploit is found at step 465 and this information is fed or provided to process 485), and in some embodiments, the process 400 includes, at step 485, searching, parsing, performing a lookup or otherwise identifying a signature $S_i$ for exploit $E_i$ using the known vulnerabilities, exploits and signatures repository 440. If the tool identifies a relevant signature $S_i$ for the exploit $E_i$, the process 400 can include enabling $S_i$ by appending $S_i$ to the signature list of the IDS/IPS of the protected system at step 480.

If the tool determines at step 485 that a signature does not exist for the exploit, the process can include determining whether a signature can be generated for the exploit at step 490. For example, signatures can be generated using various techniques including, e.g., statistical packet anomaly detection engine, Hamsa: fast signature generation for zero-day polymorphic worms with provable attack resilience, Polygraph: automatically generating signatures for polymorphic worms, dynamic taint analysis for automatic signature generation of exploits on commodity software, honeycomb—creating intrusion detection signatures using honeypots, automatic generation of buffer overflow attack signatures based on behavior models, Petri net-based signatures, etc. If $S_i$ can be generated, the tool creates the signature at step 490 and enables it in the IDS/IPS of the protected system at step 480. Otherwise, the tool generates an alert at step 470 and provides, transmits, or otherwise conveys the alert to a system administrator via a user interface.

At step 460, if the tool determines that there is not a known exploit $E_i$ for $V_i$, the process can include searching the known vulnerabilities, exploits and signatures repository 440 to determine whether there is a signature $S_i$ for $V_i$ at step 475. If the tool identifies an $S_i$ at step 475, the tool enables $S_i$ by appending $S_i$ to the signature list of the IDS/IPS of the protected system at step 480. It should be noted that in case that there is no signature at step 475, (e.g., there is no known relevant $E_i$ nor $S_i$ for $V_i$), the process may do nothing because $V_i$ may be a vulnerability of the protected system with unknown exploitation methods (e.g., if an exploit for the vulnerability does not exist then an attacker may not be able to take advantage of the vulnerability yet).

Referring to FIG. 5, an embodiment of a method 500 of self-tuning a network intrusion, detection and prevention system is shown. In some embodiments, the network security tool 120, or one or more components, modules, or processors thereof, can be designed, constructed or configured to perform one or more steps of process 500. In some embodiments, method 500 may be performed at, during, or in associated with step 435 shown in FIG. 4. In some embodiments, FIG. 5 can represent an illustrative sequence diagram that results in initiating, reinitiating or restarting the optimization process shown in FIG. 4. At step 505, a Worldwide Security Repository can receive a new security item, such as a vulnerability, exploit, or signature for same, and record this information in the repository (e.g., as shown in step 430 of FIG. 4). At step 510, an update service may receive the new security item via a real-time data feed, periodic data feed, notification, alert, prompt, email, or other communication (e.g., as shown in step 435 of FIG. 4). At step 515, a main process may receive a notification of the update (e.g., as shown in step 425 of FIG. 4). Responsive to receiving the notification of the update, the tool may initiate or reinitiate the main process if the main process was in an idle state (e.g., as shown in step 425 of FIG. 4). At step 520, the main process may proceed to checking known vulnerabilities, exploits and signatures (e.g., as shown in step 440 of FIG. 4).

Referring to FIG. 6, an embodiment of a method 600 of self-tuning a network intrusion, detection and prevention system is shown. In some embodiments, the network security tool 120, or one or more components, modules, or processors thereof, can be designed, constructed or configured to perform one or more steps of process 600. In some embodiments, method 600 may be performed at, during, or in associated with step 405 shown in FIG. 4. In some embodiments, FIG. 6 can represent an illustrative sequence diagram that results in initiating, reinitiating or restarting the optimization process shown in FIG. 4.

In some embodiments, at step 605, the method starts by performing a vulnerability assessment or obtaining security information from a vulnerability assessment. For example, the tool may compute vulnerabilities of a private or protected network using one or more vulnerability assessment or vulnerability scanning techniques. If the vulnerability assessment identifies one or more vulnerabilities, the identified vulnerability and/or signature for same can be stored in an active vulnerabilities repository at step 610 (e.g., similar to step 420 of FIG. 4). Responsive to storing, providing, or otherwise identifying an active vulnerability, the tool can initiate a main process (e.g., optimization process 425 of FIG. 4) at step 615.

Referring to FIG. 7, an embodiment of a method 700 of self-tuning a network intrusion, detection and prevention system is shown. In some embodiments, the network security tool 120, or one or more components, modules, or processors thereof, can be designed, constructed or configured to perform one or more steps of process 700. In some embodiments, method 700 may be performed at, during, or in associated with step 410 shown in FIG. 4. In some embodiments, FIG. 7 can represent an illustrative sequence diagram that results in initiating, reinitiating or restarting the optimization process shown in FIG. 4.

At step 705, the tool can perform real time monitoring of a protected network by analyzing network traffic, data packets, or aggregated activities logs to identify vulnerabilities. Upon identifying an active vulnerability, the tool can store the vulnerability in an active vulnerabilities repository at step 710. At step 715, the main process can receive an update indicating an active vulnerability, and the main process can initiate if idle.

Referring to FIG. 8, an embodiment of a method 800 of self-tuning a network intrusion, detection and prevention system is shown. In some embodiments, the network security tool 120, or one or more components, modules, or processors thereof, can be designed, constructed or configured to perform one or more steps of process 800. In some embodiments, method 800 may be performed at, during, or in associated with step 425 shown in FIG. 4. In some embodiments, FIG. 8 can represent an illustrative sequence diagram that results in initiating, reinitiating or restarting the optimization process shown in FIG. 4.

In some embodiments, at step 805, the main process can initiate if idle, generate an alert, or reinitiate if idle (e.g., as shown at step 425 in FIG. 4). At step 810, the tool can determine that an active vulnerability exists and identify a corresponding exploit and signature. At step 815, the tool can enable the signature in an intrusion detection and prevention system (IDS/IPS). Thereafter, the tool may return to an idle state and await a further update.

Figure 9:
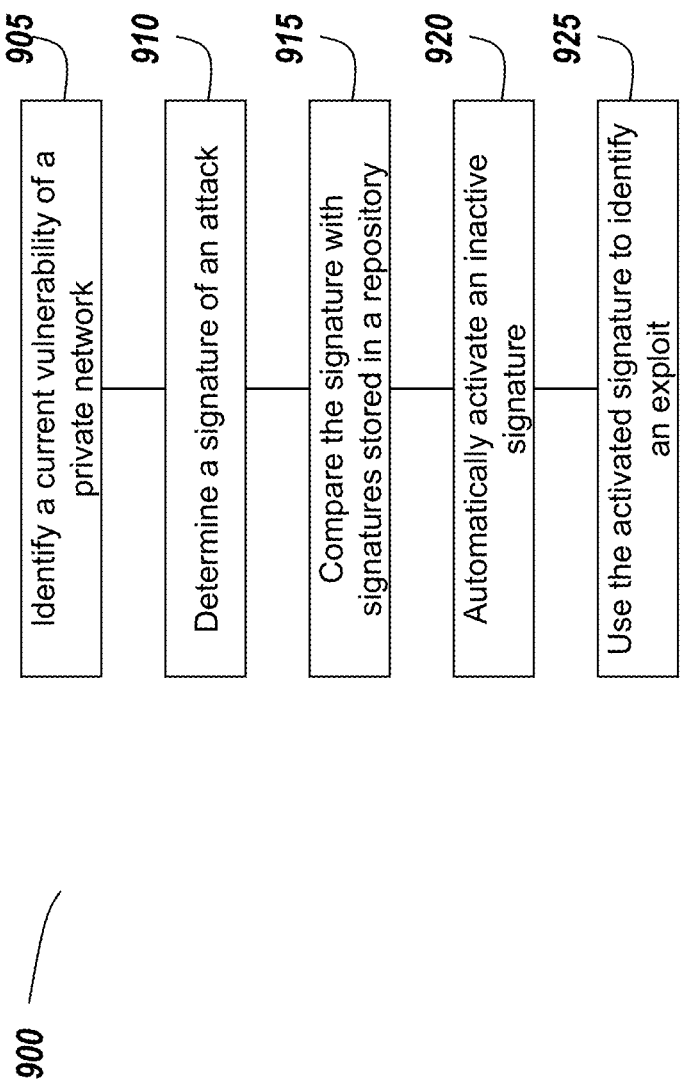
FIG. 9 is an illustrative embodiment of a method of mitigating intrusions using a network security tool.

Referring to FIG. 9, an illustrative embodiment of a method 900 of mitigating intrusions using a network security tool. In brief overview, and in some embodiments, the tool identifies a current vulnerability of a private network at step 905. At step 910, the tool determines a signature of an attack configured to exploit the vulnerability (e.g., signature of the exploit). At step 915, the tool compares the signature of the exploit with active and inactive signatures stored in a signature repository. At step 920, the tool automatically activates the signature of the exploit responsive to determining that the signature was inactive. At step 925, the tool uses the activated signature to detect or identify an attack exploiting the vulnerability.

In further detail, at step 905, the tool identifies a current vulnerability of a private or protected network. The tool may use a vulnerability assessment tool to identify current vulnerabilities. The tool may receive a current vulnerabilities list from a vulnerability assessment tool. In some embodiments, the tool may receive or access a current vulnerabilities list in a current vulnerabilities database. The current vulnerabilities may be determined by analyzing network traffic, TCP traffic, aggregated activities logs, etc. The tool can identify one or more vulnerabilities at step 905. The vulnerabilities may be of the private network or one or more device, node, router, software, operating system or database associated with or connected to the private network, or otherwise using the private network.

At step 910, the tool determines a signature of an attack configured to exploit the vulnerability (e.g., signature of the exploit). In some embodiments, a vulnerability assessment tool can identify the signature of the exploit for the current vulnerability. The tool can identify the signature by performing a lookup in one or more databases, or using one or more signature identification techniques or pattern recognition techniques. The tool can identify the vulnerability or signature based on a common scheme or standard. In some embodiments, the tool can identify several signatures of attacks that are configured to exploit the vulnerability or multiple vulnerabilities. In some embodiments, the tool can use a using a fuzzy logic algorithm to determine the signature of the attack configured to exploit the current vulnerability. For example, the tool can employ approximate reasoning using fuzzy logic variables that have truth values that range in degree between 0 and 1 in order to identify a signature or pattern of an attack configured to exploit a vulnerability.

At step 915, the tool compares the signature of the exploit with active and inactive signatures stored in a signature repository. In some embodiments, the tool may compare signatures that are in a common scheme or standard. In some embodiments, comparing signatures may include performing a lookup in a repository, a matching technique, a comparison technique, or other technique used to identify a matching signature. In some embodiments, the signatures may be tagged with metadata or other identifiers (e.g., alphanumeric, numeric, characters, strings, text, symbols, etc.) that identify a signature, and comparing signatures may include comparing the identifiers (e.g., unique identifier for each signature of an exploit).

Upon identifying a match, the tool may determine whether the matching signature is active or inactive. For example, a first repository may include active signatures and a second repository may include inactive signatures, in which case the status of a signature may be determined based on which repository was searched. In another example, a signature may be tagged with a status indicating whether the signature is active or inactive. For example, a data file storing the signature may include status information, identifying information or other information of the signature. In some embodiments, the data file storing the signature may include historical status information, such as time or date information indicative of when the signature was last active, or each time the signature was active or inactive, a duration of activity, associated vulnerabilities, exploits, network configurations, devices, operating systems, etc.

If the tool determines that the current vulnerability corresponds to an inactive signature, at step 920, the tool automatically activates the signature of the exploit responsive to determining that the signature was inactive. Activating the signature may include altering or updating a status of the signature from inactive to active, or providing the signature to an active signature repository, or providing the signature to an IDS/IPS system.

At step 925, the tool uses the activated signature to detect or identify an attack exploiting the vulnerability. For example, the tool can use an intrusion detector or IDS/IPS system to analyze network traffic, data packets, TCP packets, etc. to identify a traffic pattern or data that corresponds to the active signature in order to mitigate or prevent the attack.

Figure 10:
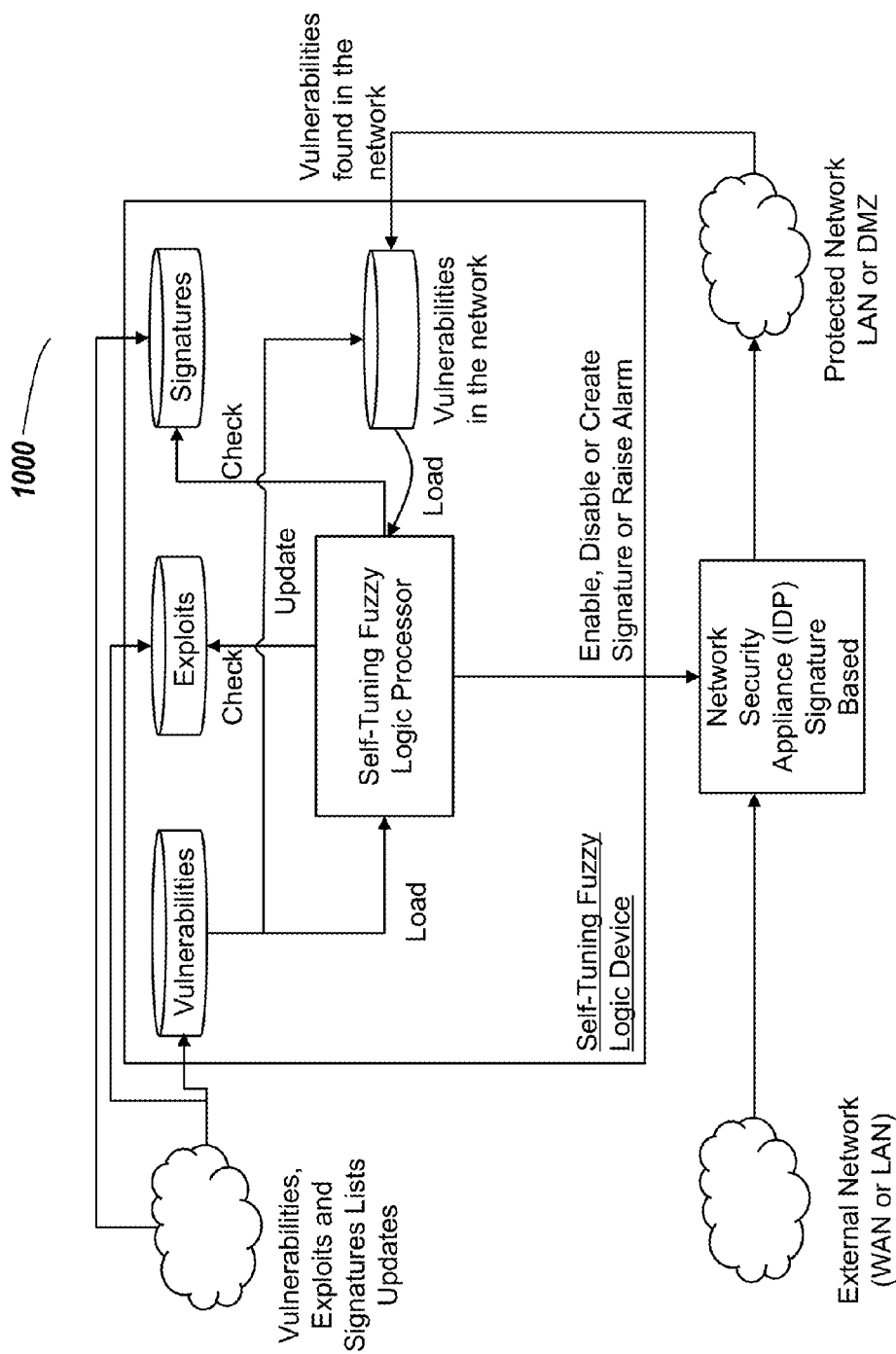
FIGS. 10 and 11 are illustrative implementations of a network security tool, in accordance with embodiments.
Figure 11:
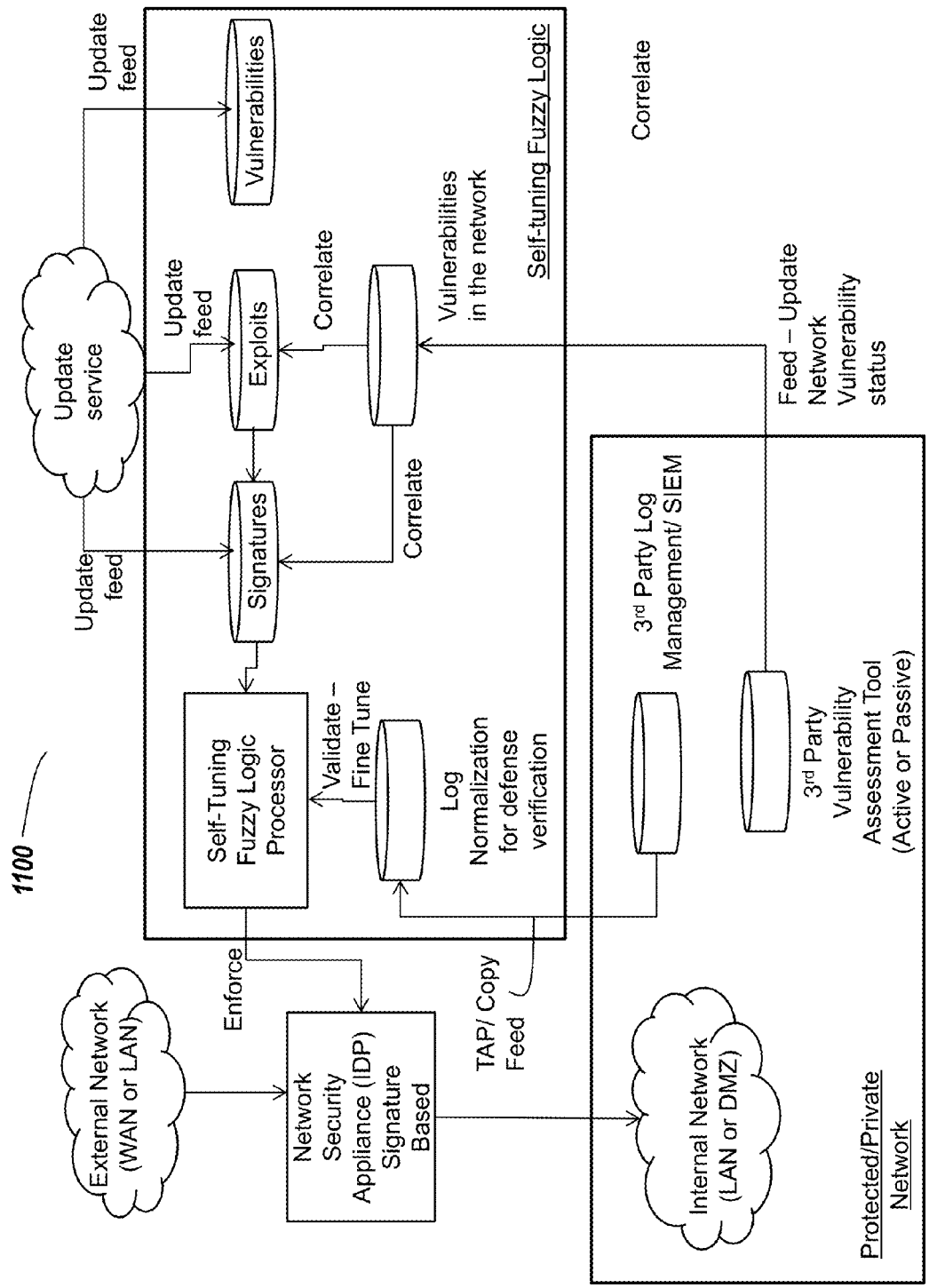

FIGS. 10 and 11 refer to illustrative implementations of a system including a network security tool. In the illustrative implementation shown in FIG. 10, the system 1000 includes a self-tuning fuzzy logic device. The self-tuning fuzzy logic device may include one or more functionality of the network security tool 120, or the network security tool 120 may include one or more functionality of the self-tuning fuzzy logic device of system 1000. The device can include a self-tuning fuzzy logic process that performs one or more function as shown in optimization process 400 of FIG. 4. For example, the device can include databases storing vulnerabilities, exploits, and signatures, and access same.

In some embodiments, the signature based network security appliance (IDP) can be external to the device. For example, the self-tuning fuzzy logic device, or network security tool 120 of FIG. 2, can be a separate device from the IDPS.

In the illustrative implementation shown in FIG. 11, the system 1100 includes a self-tuning fuzzy logic device or network security tool. Further, the system 1100 includes a protected or private network. Included in this private network is a third party vulnerability assessment tool (active or passive) and a third party log management system or a security information and event manager (SIEM). An SIEM may refer to software and products services combining security information management (SIM) and security event management (SEM). SIEM technology can provide real-time analysis of security alerts generated by network hardware and applications. SIEM may include software, appliances or managed services, and can log security data and generate reports for compliance purposes. Further, in system 1100, the network security appliance (IDP) is also separate from the self-tuning fuzzy logic device or network security tool, similar to system 1000. In various embodiments, the system 200 shown in FIG. 2 can include one or more components or configurations as shown in systems 1000 and 1100 of FIGS. 10 and 11, respectively.

Thus, and in some embodiments, the tool can provide real-time automatic tuning of the IDP/IDS line of defense of a system/network. The tool can automatically tune a signature repository of the IDP/IDS line of defense based on the latest vulnerability profile of the protected system as it is formed by the results of vulnerability assessment and evolved passively by the feedback mechanism. The tool provides a smart, custom, and automatic process that brings the VA and IDP/IDS worlds in convergence. The tool provides a dynamic, recurring, fully automated IDS/IPS tuning process that also supports alerting capabilities in case that there are vulnerabilities that are not mapped to signatures, as well as, the potentiality for generation of new signatures. The tool leverages a passive vulnerability assessment process that runs along with the operation of the assessed system or protected network with dynamic and constant update of vulnerability intelligence.

While the invention has been particularly shown and described with reference to specific embodiments, it should be understood by those skilled in the art that various changes in form and detail may be made therein without departing from the spirit and scope of the invention described in this disclosure.

What is claimed is:

1. A method of mitigating intrusions via a computer network, comprising:
   identifying, by a vulnerability assessment tool, a current vulnerability of a private network;
   determining, by the vulnerability assessment tool, a signature of an attack configured to exploit the current vulnerability;
   comparing, by a network security device, the signature with active and inactive signatures stored in a signature repository to identify an inactive signature corresponding to the signature of the attack configured to exploit the current vulnerability, the inactive signature previously activated and used by the network security device to detect exploits;
   automatically activating, by the network security device responsive to the comparison, the identified inactive signature; and
   using, by an intrusion detector, the activated signature to analyze data packets received via the private network to detect an exploit.

2. The method of claim 1, further comprising:
   identifying, by the vulnerability assessment tool, a second active signature stored in the signature repository;
   obtaining, by the network security device, a plurality of signatures corresponding to one or more active vulnerabilities of the private network;
   automatically deactivating, by the network security device, the second active signature responsive to the second signature being absent from the plurality of signatures corresponding to the one or more active vulnerabilities of the private network.

3. The method of claim 1, further comprising:
   continuously monitoring network traffic of the private network via one or more activity logs;
   identifying, based on the monitoring, a second current vulnerability of the private network;
   determining a second signature of a second attack configured to exploit the second current vulnerability;
   comparing the second signature with the active and inactive signatures stored in the signature repository;
   determining, based on the comparison, that the second signature corresponds to an active signature stored in the signature repository; and
   using, by the intrusion detector, the active signature corresponding to the second signature to identify a second exploit based on data packets received via the private network.

4. The method of claim 1, further comprising:
   identifying a plurality of current vulnerabilities of the private network;
   identifying a plurality of signatures corresponding to the plurality of current vulnerabilities;
   comparing the plurality of signatures with the active and inactive signatures stored in the signature repository;
   automatically activating, responsive to the comparison, inactive signatures stored in the signature repository that correspond to the plurality of signatures; and
   automatically deactivating, responsive to the comparison, active signatures stored in the signature repository that do not correspond to the plurality of signatures.

5. The method of claim 1, further comprising:
   receiving an indication that the current vulnerability is resolved; and
   automatically deactivating, responsive to the indication, the signature corresponding to the current vulnerability.

6. The method of claim 1, further comprising:
   using a fuzzy logic algorithm to determine the signature of the attack configured to exploit the current vulnerability.

7. The method of claim 1, further comprising:
   identifying a second current vulnerability of the private network;
   determining a second signature of a second attack configured to exploit the second current vulnerability;
   comparing the second signature with the active and inactive signatures stored in the signature repository;
   determining, based on the comparison, that the second signature does not correspond to active or inactive signatures stored in the signature repository; and
   automatically generating, based on the comparison, a new signature based on the second signature; and
   activating and storing the new signature in the signature repository for use by the intrusion detector.

8. The method of claim 1, wherein the signature comprises an attack pattern.

9. The method of claim 1, further comprising:
   receiving a plurality of logs of network activity associated with computing devices of the protected network; and
   determining, based on the plurality of logs, a pattern indicative of a signature of an attack.

10. The method of claim 1, further comprising:
    monitoring, by the intrusion detector, the data packets of the private network to identify the exploit based on the active signature corresponding to the second signature;
    responsive to identifying the second exploit, generating an alert; and
    providing the alert to an administrator device of the private network.

11. The method of claim 1, further comprising:
    obtaining, via a public network, updates on current vulnerabilities established by a plurality of users of the public network.

12. A system for mitigating intrusions via a computer network, comprising:
    a vulnerability assessment tool configured to identify a current vulnerability of a private network and determine a signature of an attack configured to exploit the current vulnerability;
    a network security device configured to:
      compare the signature with active and inactive signatures stored in a signature repository to identify an inactive signature corresponding to the signature of the attack configured to exploit the current vulnerability, the inactive signature previously activated and used by the network security device to detect exploits;
      automatically activate, responsive to the comparison, the identified inactive signature; and
      deactivate, responsive to the comparison, an active signature stored in the signature repository that does not correspond to the signature of the attack configured to exploit the current vulnerability; and an intrusion detector configured to use the activated signature to identify an exploit based on data packets received via the private network.

13. The system of claim 12, wherein:
the vulnerability assessment tool is further configured to identify a second current vulnerability of the private network and determine a second signature of a second attack configured to exploit the second current vulnerability;
the network security device is further configured to:
compare the second signature with the active and inactive signatures stored in the signature repository;
determine, based on the comparison, that the second signature corresponds to an active signature stored in the signature repository; and
the intrusion detector is further configured to use the active signature corresponding to the second signature to identify a second exploit based on data packets received via the private network.

14. The system of claim 12, wherein:
the vulnerability assessment tool is further configured to identify a plurality of current vulnerabilities of the private network and identify a plurality of signatures corresponding to the plurality of current vulnerabilities; and
the network security device is further configured to:
compare the plurality of signatures with the active and inactive signatures stored in the signature repository;
automatically activate, responsive to the comparison, inactive signatures stored in the signature repository that correspond to the plurality of signatures; and
automatically deactivate, responsive to the comparison, active signatures stored in the signature repository that do not correspond to the plurality of signatures.

15. The system of claim 12, further configured to:
receive an indication that the current vulnerability is resolved; and
automatically deactivate, responsive to the indication, the signature corresponding to the current vulnerability.

16. The system of claim 12, wherein the vulnerability assessment is further configured to:
use a fuzzy logic algorithm to determine the signature of the attack configured to exploit the current vulnerability.

17. The system of claim 12, wherein:
the vulnerability assessment tool is further configured to identify a second current vulnerability of the private network and determine a second signature of a second attack configured to exploit the second current vulnerability; and
the network security device is further configured to:
compare the second signature with the active and inactive signatures stored in the signature repository;
determine, based on the comparison, that the second signature does not correspond to active or inactive signatures stored in the signature repository; and
automatically generate, based on the comparison, a new signature based on the second signature; and
activate and store the new signature in the signature repository for use by the intrusion detector.

18. The system of claim 12, wherein the signature comprises an attack pattern.

19. The system of claim 12, wherein the vulnerability assessment tool is further configured to:
receive a plurality of logs of network activity associated with computing devices of the protected network; and
determine, based on the plurality of logs, a pattern indicative of a signature of a attack.

20. The system of claim 12, wherein the intrusion detector is further configured to:
monitor the data packets of the private network to identify the exploit based on the active signature corresponding to the second signature;
responsive to identifying the second exploit, generate an alert; and
provide the alert to an administrator device of the private network.

* * * * *